US008515834B2

(12) United States Patent
Henderson et al.

(10) Patent No.: US 8,515,834 B2
(45) Date of Patent: Aug. 20, 2013

(54) INVENTORY MANAGEMENT SYSTEM

(75) Inventors: Michael Henderson, Parker, CO (US);
David Pytel, Dillon, CO (US); Preston McCreary, Larkspur, CO (US); Gerson Cortes, Southampton, NJ (US)

(73) Assignee: Flowvision, LLC, Dillon, CO (US)

( * ) Notice: Subject to any disclaimer, the term of this patent is extended or adjusted under 35 U.S.C. 154(b) by 611 days.

(21) Appl. No.: 12/544,947

(22) Filed: Aug. 20, 2009

(65) Prior Publication Data
US 2010/0312611 A1 Dec. 9, 2010

Related U.S. Application Data

(63) Continuation-in-part of application No. 11/218,971, filed on Sep. 2, 2005.

(51) Int. Cl.
*G06Q 10/00* (2012.01)
(52) U.S. Cl.
USPC .............................. 705/28; 705/301
(58) Field of Classification Search
USPC .................. 235/379, 380; 705/16, 26, 28, 36
See application file for complete search history.

(56) References Cited

U.S. PATENT DOCUMENTS

| 5,216,612 | A | * | 6/1993 | Cornett et al. ................. 700/96 |
| RE36,360 | E | | 10/1999 | Costanza |
| 5,963,919 | A | | 10/1999 | Brinkley et al. |
| 6,078,900 | A | | 6/2000 | Ettl et al. |
| 6,128,588 | A | | 10/2000 | Chacon |
| 6,198,980 | B1 | | 3/2001 | Costanza |
| 6,341,271 | B1 | | 1/2002 | Salvo et al. |
| 6,418,416 | B1 | | 7/2002 | Rosenberg et al. |
| 6,594,535 | B1 | | 7/2003 | Costanza |
| 6,611,726 | B1 | | 8/2003 | Crosswhite |
| 2002/0072988 | A1 | * | 6/2002 | Aram .............................. 705/26 |
| 2002/0143669 | A1 | * | 10/2002 | Scheer ............................ 705/28 |
| 2003/0055731 | A1 | | 3/2003 | Fouraker et al. |
| 2004/0068455 | A1 | | 4/2004 | Jacobus et al. |
| 2006/0026072 | A1 | | 2/2006 | Suguro |
| 2008/0177593 | A1 | | 7/2008 | Clayton et al. |
| 2008/0177599 | A1 | | 7/2008 | McPhetrige |

OTHER PUBLICATIONS

John T Blake, Michael W Carter, A goal programming approach to strategic resource allocation in acute care hospitals, European Journal of Operational Research. Amsterdam: Aug. 1, 2002. vol. 140, Iss. 3; p. 541 (Attached).*

* cited by examiner

*Primary Examiner* — Matthew Gart
*Assistant Examiner* — Rokib Masud
(74) *Attorney, Agent, or Firm* — Marsh Fischmann & Breyfogle LLP

(57) ABSTRACT

A statistical inventory management system may optimize inventory investment using historical usage and/or consumption of an inventory component by determining one or more target inventory levels (e.g., replenishment levels). Historical usage data may be summed for a plurality of at least partially non-overlapping time periods that may be each equal in duration to a supplier lead-time period for the component to create lead-time usage data. The lead-time usage data may be utilized to more accurately determine future inventory levels (e.g., target inventory levels) because the lead-time usage data may have a reduced variance compared to, for example, day-to-day usage. The inventory management system may be employable by a computing system having a display module (e.g., GUI) that allows a user to receive at least one graphical representation indicative of at least one target inventory level of at least one inventory component (e.g., by selectively interacting with the display module).

28 Claims, 17 Drawing Sheets

| Date   | 5/1 | 5/2 | 5/3 | 5/4 | 5/5 | 5/6 | 5/7 | 5/8 | 5/9 | 5/10 | 5/11 | 5/12 | 5/13 | 5/14 | 5/15 | 5/16 | 5/17 | 5/18 | 5/19 | 5/20 |
|--------|-----|-----|-----|-----|-----|-----|-----|-----|-----|------|------|------|------|------|------|------|------|------|------|------|
| Part A | 55  | 77  | 71  | 96  | 130 | 135 | 167 | 146 | 96  | 50   | 187  | 176  | 132  | 169  | 246  | 142  | 121  | 138  | 220  | 200  |
| Part B | 2   | 5   | 9   | 1   | 0   | 7   | 2   | 7   | 3   | 4    | 4    | 0    | 9    | 2    | 3    | 7    | 0    | 5    | 5    | 4    |

FIG. 4

| Part Number | KANBAN? | Target Service Level | Supplier Lead Time | MOQ | ABC Segmentation | Unit Cost |
|-------------|---------|----------------------|--------------------|-----|------------------|-----------|
| 111 | Yes | 99.999% | 5  | 10    | A | $5.25 |
| 222 | Yes | 99.999% | 5  | 10    | A | $9.90 |
| 333 | Yes | 99.999% | 5  | 50    | B | $1.00 |
| 444 | Yes | 99.999% | 15 | 1,000 | C | $0.25 |

FIG. 5

| Date | 5/1 | 5/2 | 5/3 | 5/4 | 5/5 | 5/6 | 5/7 | 5/8 | 5/9 | 5/10 | 5/11 | 5/12 | 5/13 | 5/14 | 5/15 | 5/16 | 5/17 | 5/18 | 5/19 | 5/20 |
|---|---|---|---|---|---|---|---|---|---|---|---|---|---|---|---|---|---|---|---|---|
| Part A | 55 | 77 | 71 | 98 | 130 | 135 | 167 | 146 | 96 | 50 | 187 | 176 | 132 | 169 | 246 | 142 | 121 | 138 | 220 | 200 |
| Part A | - | - | - | - | - | - | 731 | 822 | 841 | 820 | 911 | 957 | 954 | 956 | 1056 | 1102 | 1173 | 1124 | 1168 | 1236 |
| Part B | 2 | 5 | 9 | 1 | 0 | 7 | 2 | 7 | 3 | 4 | 4 | 0 | 9 | 2 | 3 | 7 | 0 | 5 | 5 | 4 |
| Part B | - | - | 18 | 15 | 10 | 8 | 9 | 16 | 12 | 14 | 11 | 8 | 13 | 11 | 14 | 12 | 10 | 12 | 10 | 14 |

FIG. 7

| LT Sum (4 day) | 76 | 74 | 66 | 63 | 61 | 63 | 71 | 69 | 74 | 57 |
|---|---|---|---|---|---|---|---|---|---|---|
| μ (LT Sum) | 68.4 | | | | | | | | | |
| σ (LT Sum) | 5.0 | | | | | | | | | |
| SL | 99.9 | | | | | | | | | |
| x (# of SD) | 3 | | | | | | | | | |
| Stat KB | 83.4 | | | | | | | | | |

- Calculate across LT Sums
  - mean μ
  - Standard Deviation σ
- Determine Service Level SL and "x" # of Std. Devs.
- Stat Kanban Qty = μ + x×σ

FIG. 11

| Service Level | Service Level Factor |
|---|---|
| 80% | 0.84 |
| 90% | 1.28 |
| 94% | 1.55 |
| 95% | 1.64 |
| 96% | 1.75 |
| 97% | 1.88 |
| 98% | 2.05 |
| 99% | 2.33 |
| 99.5% | 2.57 |
| 99.9% | 3.09 |
| 99.99% | 3.72 |

FIG. 12

INVENTORY MANAGEMENT SYSTEM

RELATED APPLICATIONS

This application is a continuation-in-part of U.S. Non-Provisional application Ser. No. 11/218,971, entitled "INVENTORY MANAGEMENT SYSTEM," filed Sep. 2, 2005, the entirety of which is hereby incorporated by reference.

FIELD OF THE INVENTION

The present invention relates generally to an inventory management system, and more particularly, to use of inventory procurement/replenishment lead-time information for use in reducing or otherwise optimizing on-hand inventory.

BACKGROUND

Inventory management is important for retail businesses involved with the sale of finished goods and products as well as for manufacturing businesses that produce finished goods, products and/or components for use in other goods and products. Stated otherwise, goods and material availability, having the proper amount of finished goods, products, components and/or raw materials, is critical to the success of a business. For instance, if a retail business selling finished goods has an insufficient on-hand inventory, sales may be lost when customers go elsewhere to purchase the unavailable goods. This may also erode the customer base of the business. Alternatively, maintaining an excess of on-hand inventory may increase costs for the business. Costs associated with excess inventory may include, without limitation maintenance costs, storage costs, spoilage costs, damage costs, the waste of assets such as cash, the excess expense of interest, and/or depreciation of the value of the inventory. In any case, excessive inventory generally ties up capital that may be more effectively utilized elsewhere. Manufacturing businesses face many of the same challenges. In this regard, a manufacturer may require a plurality of manufacturing parts/components for use in producing a good. An insufficient on-hand inventory of any such components may result in delayed production, delayed delivery and, ultimately low customer satisfaction. As with retail businesses, manufacturing businesses also must balance the need for on-hand inventory with the costs of carrying excessive inventory.

Generally, this balance includes an analysis of the amount of on-hand inventory a business will carry versus a percentage of time when they desire to have the goods/components available. Complicating this analysis is the variable nature of demand and/or usage of goods/components including, without limitation, consumer demand, product sales growth/decline, the unpredictability of supply lead-time for re-ordering goods/components, and the unpredictability of the quality of the goods/components, etc. To attempt to address these and other concerns, a number of "lean flow" inventory management systems have been implemented. While such inventory management systems typically utilize different re-order points and replenishment quantities, these systems generally attempt to reduce inventory carrying costs. Such systems include fixed-rate supply systems (where replenishment inventory is supplied at a fixed rate) and make-to-order systems (where products are only manufactured after they are ordered).

Another management system is a "just-in-time" production/stocking system often referred to as Kanban. Generally, in the Kanban system, a small on-hand inventory is maintained and this on-hand inventory is replenished as it is depleted. Upon depletion of a good/component to a predetermined level, the Kanban inventory control system authorizes production or movement of replacement goods/components. Historically, Kanban was a card or signboard that was attached to specific parts in a production line. These cards and signboards signify the need for replenishment of a given quantity of the specific part. The authorized replenishment quantity is preferably minimized to reduce carrying costs. The replenishment quantity for a specific part or item is determined in part by the demand rate for the item and the time required producing or acquiring more of the items. The replenishment quantity generally is established and remains unchanged unless demand or other circumstances are altered dramatically; in this way inventory is kept under control while production is forced to keep pace with shipment volume. While originally a card system used in Japan, Kanban systems now include empty containers, empty spaces and even electronic messages to signal the need for replenishment of depleted items.

When implemented, the Kanban system operates according to the following rule: all production and movement of parts and material takes place only as required by a downstream operation, i.e., all manufacturing and procurement are ultimately driven by the requirements of final assembly or equivalent (e.g., sales). The Kanban system has been adapted to have various formats and content as appropriate for usage with different businesses. For example, a Kanban system for a retail business is different than a Kanban system for a manufacturing business. Regardless, any Kanban system incorporates a method for signaling suppliers or upstream production operations when it is time to replenish depleted stocks of goods, components or subassemblies based on consumption.

While simple in concept, the variable nature of business sales and/or production makes determining when and how many replenishment items should be ordered a difficult problem. Ideally, the time and quantity of the replenishment order should allow the on-hand inventory and hence inventory investment to be minimized while ensuring adequate supplies for nearly uninterrupted manufacturing operations and/or sales.

SUMMARY OF THE INVENTION

The inventors have recognized that five main factors may influence the application of lean flow techniques to any given materials component (as used herein, materials component is meant to include, without limitation, finished goods and products, manufacturing components as well as raw materials). These factors are:

1. Customer-lead-time expectations.
2. Replenishment lead-time variability for each component.
3. Usage variability for each component.
4. Contribution of each component to overall product cost.
5. Optimal replenishment frequency for each component.

Generally, customer-lead-time expectations may vary with a given product. For instance, when a product is a commodity, customers may expect short to zero lead-time. If a provider of the commodity does not have the commodity on-hand, the customer may find a different provider. On the other end of the spectrum are highly specialized products that customers may expect to order well in advance of a required shipment date. Most products may fall between these extremes. For any given product, a customer service level may exist that needs to be met for a business to be successful.

The inventors have further recognized that little control may be exerted over customer lead-time expectations. Accordingly, the inventors have recognized that optimizing the financial performance of inventory may be done by maintaining a desired or necessary customer service level (e.g., percentage of time that a particular performance aspect (e.g., on-time delivery, correct order) is met) for a given product while focusing on factors 2 through 5.

The replenishment lead-time for each component of a product may vary. For instance, a finished product may include multiple separate components and each component may have a different replenishment lead-time. At least an average replenishment lead-time for each component may be known. However, it may further be realized that an average lead-time may mean that 50% of the time the lead-time is less than the average and that 50% of the time the lead-time is greater than the average. The inventors have realized it may be desirable for the lead-time values utilized in inventory management to be set at a value that assures a predetermined percentage (e.g., 99%) of component deliveries fall within the lead-time utilized for inventory management purposes.

Usage of individual components may vary on a daily basis. While an average usage over a given time period may be an easy calculation for most inventory management systems, such an average usage typically assumes a constant rate of consumption, which may not be true in actual settings. Factors such as seasonal demand, product growth and other variable factors may affect the usage of a given component. Stated otherwise, components may be subject to irregular variation in actual settings.

While irregular variation may be unpredictable it may also be quantifiable. For instance, historical usage variation may be analyzed statistically to determine, for example, the standard deviation, which is a measure of variability. Accordingly, the inventors have determined it may be desirable to maintain an inventory that accounts for statistical variation. That is, a statistical cushion or variance amount may be added to inventory levels that may assure that no components are fully depleted during, for example, an abnormally large component usage day. While this may require additional inventory investment, it may be balanced against the potential of missing a delivery/sale and/or reduced efficiency.

In a further option, the inventors have recognized inventory management may provide greater benefits when applied to only certain components of a given product. For instance, it is generally accepted that most of a product's cost may be represented by a small group (e.g., 20%) of the components that make up the product. Accordingly, in some instances most of the benefit of inventory optimization may be achieved by optimizing the inventory of the high-cost components, which have high carrying costs, while maintaining high volumes of low cost components, which have low carrying costs. Further, for such low cost components, frequent replenishment may increase acquisition costs (e.g., shipping) and may offset the benefit of optimized inventory.

Typically, it may be desirable for replenishment frequency for a component to strike a financial break-even between asset carrying cost savings, or asset utilization improvement targets, and increased component acquisition costs. The potential for carrying cost savings may be greater on the relatively small number of high-cost materials which may be profitably replenished more frequently. In contrast, frequent replenishment of the majority of low cost component may generate more acquisition costs than carrying-cost savings.

According to a first aspect, an inventory control system is provided for determining a target inventory level of at least one component of a product. The target inventory level may be a component inventory level that, inter alia, reduces on-hand and on-order inventory while ensuring adequate supplies for nearly uninterrupted manufacturing operations and/or sales. The system broadly includes a computer readable medium, a processor, and a display module operable to provide at least one graphical representation indicative of at least one of a plurality of target inventory levels, component usage data of the at least one component (e.g., historical, forecast), and lead-time usage data, as a function of time.

The computer readable medium may include any appropriate information (e.g., data, code, instructions) to determine or establish the one or more target inventory levels of one or more components of one or various products. For instance, the computer readable medium may include component usage data indicative of a magnitude of at least one of historical consumption of the at least one component during a time period and forecasted consumption of the at least one component during a time period. The computer readable medium may also include a target inventory module that is employable to determine the plurality of target inventory levels for the at least one component. Furthermore, the target inventory module may analyze the component usage data. For instance, the target inventory module may include one or more types or sets of computer readable instructions (e.g., code) that are operable to sum a portion of the component usage data for a plurality of at least partially non-overlapping time periods that are each equal in duration to a supplier lead-time period for the at least one component to create lead-time usage data, and determine the plurality of target inventory levels from the lead-time usage data. The processor may appropriate implement or otherwise employ the computer readable instructions to determine the plurality of target inventory levels.

Various refinements exist of the features noted in relation to the aspects and embodiments disclosed herein, and these refinements along with additional features may exist individually or in any combination. In one arrangement, at least one of the plurality of target inventory levels may be appropriately determined (e.g., via computer readable instructions, code) by summing or adding together a base inventory amount and a statistical or variance amount. The base inventory amount may represent an inventory amount based on historical component usage data to eliminate conjecture from the analysis or else forecasted data when historical component usage data is unavailable or would be irrelevant. The variance amount may represent a statistically-determined cushion that may be added to the base inventory amount to assist in ensuring that a manufacturer or supplier is rarely in a situation with no on-hand or on-order quantities of a particular component.

For instance, the computer readable instructions may be operable to statistically determine the variance amount by carrying out the steps of calculating a standard deviation of the lead-time usage data, identifying a number of standard deviations that includes a predetermined percentage of the lead-time data, and multiplying the standard deviation by the number of standard deviations to generate the variance amount.

In another arrangement, the processor may utilize a number of computer readable instruction sets to determine a number of target inventor levels for the at least one component. For example, a first of the plurality of different computer readable instruction sets may be operable to carry out the steps of determining an average of the lead-time usage data to create the base inventory amount and summing the base inventory amount and the variance amount. As these steps typically utilize only historical data, it may be advantageous in determining target inventory levels for products with little growth. Another of the plurality of different computer readable instruction sets may be operable to carry out the steps of creating adjusted lead-time usage data, determining an average of the adjusted lead-time usage data to create the base inventory amount, and summing the base inventory amount and the variance amount. These steps may advantageously predict target inventory levels for components that experience one or more periods of growth but which periods then plateau or otherwise level off. In one variation, the creating step may include fitting a line to the lead-time usage data, and then using the line to calculate the adjusted lead-time usage data. In another variation, the using step may include identifying a slope of the line.

Another of the plurality of different computer readable instruction sets may be operable to carry out the steps of creating a projected growth level of the at least one component, determining an average of the lead-time usage data to create the base inventory amount, and summing the base inventory amount, the variance amount and the projected growth level. These steps may be useful in determining target inventory levels for components whose historical growth or decline may be predicted to continue into the future. In some variations, the lead-time usage data may include adjusted lead-time usage data.

Another of the plurality of different computer readable instruction sets may be operable to carry out the steps of analyzing component usage data indicative of forecasted consumption of the at least one component during a time period to create the base inventory amount, and summing the base inventory amount and the variance amount. These steps may be useful for determining a target inventory levels for products with little growth but where a known factor will be taking place (e.g., large sale). In some variations, the analyzing step may include determining dimensions or units (e.g., weeks, months) of the supplier lead-time period, obtaining an average of the component usage data indicative of forecasted consumption in the dimensions of the supplier lead-time period, and multiplying the supplier lead-time period by the average of the component usage data indicative of forecasted consumption to create the base inventory amount. Another of the plurality of different computer readable instruction sets may be operable to carry out the steps of analyzing component usage data indicative of forecasted consumption of the at least one component during a time period to create the base inventory amount, and summing the base inventory amount and the statistical inventory level. In this computer readable instruction set, the variance amount may be determined utilizing adjusted lead-time usage data. These steps may be useful for determining a target inventory level for products with growth potential (e.g., new product introduction), that will decline (e.g., end of product lifetime), or where a known factor will take place (e.g., large sale).

In another arrangement, the display module and/or an interface associated therewith may include a plurality of display regions including various forms of information related to one or more components. For instance, a first portion or region of the display module may include a number of columns and/or cells corresponding to information of a plurality of components (e.g., component name and number, target inventory levels, lead-time usage or bucket data, minimum order quantities). Another portion or region of the display module may include one or more graphical representations indicative of at least one of component usage data, lead-time usage data, target inventory levels, etc. Various other portions, regions and the like are contemplated as part of an interface usable with the display module for use with the inventory management system.

In further arrangements, the system may include one or more user interface devices and/or user controllable (e.g., cursor) devices. Broadly, the user interface and controllable devices may be operable to provide a number of user manipulable features for use with the display module (e.g., modifying at least one graphical representation). For instance, the user interface device may be operable to select a first portion of the display module corresponding with the at least one component (e.g., a cell) to display at least one graphical representation indicative of at least one of the plurality of target inventory levels for the at least one component on a second portion of the display module according to at least one of the plurality of different computer readable instruction sets. In some variations, the at least one user interface device may be selected from the group consisting of a hand manipulable point and click device, a touch screen device, a keyboard, a retinal detection device, and a voice recognition device.

One user manipulable feature may be employable to set at least one statistical range of the at least one graphical representation. One example of a statistical range is a user-defined range of data. The at least one user interface device and the at least one user controllable device may be operable to provide this feature for inputting the at least one statistical range into one or more cells of the second display region. Another user manipulable feature may be employable to display at least one pop-up window on the display module. The user interface and controllable devices may be operable to select a portion of the at least one graphical representation (e.g., a data point) to display the at least one pop-up window on the display module. In one variation, the user controllable device may be selectively positionable within the pop-up window to modify the component usage data (e.g., remove "spiked" data or else reduce the magnitude of some of the component usage data) or modify one or more statistical ranges of the at least one graphical representation.

Some embodiments provide various methodologies associated with one or more aspects of the inventory management system described herein. In one characterization, a method for use in determining at least one target inventory level of at least one component of a product is provided. The method broadly includes selecting a first portion of a display module displaying information corresponding with the at least one component, accessing component usage data (e.g., historical and/or forecast) from a computer readable medium in response to the selecting step, utilizing a processor to create lead-time usage data as previously discussed and then employing the processor to determine at least one of a plurality of target inventory levels at least partly from the lead-time usage data, and displaying at least one graphical representation on a second portion of the display module that may be indicative of at least one of the plurality of target inventory levels as a function of time. Allowing a user to select a desired component for analysis and receive one or more graphical representations of various target inventory levels of the component advantageously and efficiently conveys critical inventory level information to any entity (e.g., manufacturers, retailers) that may be affected by inventory level fluctuations while allowing such entities to account for changing conditions.

In one arrangement, the employing step may include ascertaining a variance amount of the at least one component, establishing a base inventory amount of the at least one component, and summing the variance amount and the base inventory amount to create the at least one of the plurality of target inventory levels. The ascertaining step may involve calculating standard deviations of the lead-time usage data and using a standard deviation to eventually determine the variance amount as previously discussed. Moreover, the base inventory amount may be established in various manners and using various techniques also as previously discussed.

In another arrangement, the selecting step may involve selecting one of a plurality of cells of a first region or portion of the display module that corresponds with the at least one component. In another arrangement, a portion (e.g., a data point or line) of the at least one graphical representation may be appropriately selected to display at least one pop-up window on the display module that may allow a user or operator to modify data, view more detailed information, etc.

According to another aspect, a method for use in inventory control is provided. The method includes identifying a supplier lead-time for an inventory component. Daily usage data for the inventory component may also be obtained. The daily usage data may correspond to a volume of daily usage for the inventory component (e.g., sales and/or consumption). The daily usage data may be summed for a plurality of at least partially non-overlapping time periods that are each equal in duration to the supplier lead-time period for the component. The result may be a plurality of lead-time usage data points. These lead-time usage data points may be processed to produce a target inventory level for the inventory component.

In one arrangement, the plurality of at least partially non-overlapping time periods may be series of time periods equal in length to the supplier lead-time period. In such a series, each subsequent non-overlapping time period may include the most recent day for which usage data is available while excluding the oldest daily usage data. That is, subsequent time periods may have data that is 'most recent in' last out'. As will be appreciated, two or more of the plurality of the time periods may be completely non-overlapping.

The target inventory level may include a combined total of on-hand inventory and/or on-order inventory for the inventory component. What may be important is that, upon an actual inventory level being less than the target inventory level, a replenishment order for an additional quantity of the inventory component be placed.

In one arrangement, processing the plurality of lead-time usage data points may include performing a statistical analysis on the data points to calculate a base inventory level. Such a base inventory level may include determining an average value of at least a portion of the plurality of lead-time data points. Alternatively, the base inventory level may be calculated by generating a function that characterizes at least a portion of the lead-time data usage points. This function may then be utilized to calculate a base inventory level for, for example, an upcoming time period. In any case, it may be desirable to add a statistical variance to the base inventory level to account for variations in daily/weekly use and/or consumption of the inventory component. In this regard, the target inventory level may include the base inventory level and a statistical variance amount.

A statistical variance amount may be calculated from a variation of the lead-time usage data points. For instance, such a statistical variance may be at least partially related to the standard deviation of the lead-time data points. Further, this standard deviation information may be multiplied by, for example, the number of standard deviations that include a predetermined percentage of lead-time data usage points. In this regard, this predetermined percentage may correspond to a desired customer service level. That is if a 99% customer service level is desired, the number of standard deviations that include 99% of the lead-time usage data points may be identified. This number of standard deviations may then be utilized in calculating a statistical variance amount.

In another arrangement, processing may include generating a function that characterizes at least a portion of the lead-time data points. This function may then be utilized to calculate a target inventory level. For instance, a linear regression may be performed on the lead-time-data points in order to fit a line to those points. An equation of this line may then be utilized for target inventory level calculations.

According to another aspect of the present invention, a method for use in an inventory control systems is provided. The method includes obtaining a plurality of component usage data values for a period of time. These component usage data values may each at least partially correspond to a daily consumption volume of an inventory component. A variation of the daily consumption volume may also be identified. At least a portion of this variation may then be removed from each of the plurality of component usage data values to generate a plurality of adjusted usage data values. The adjusted usage data values may then be utilized to produce a target inventory level.

By removing the variation from the component usage data values, an observable or pre-determinable variation may be eliminated from inventory size calculations. For instance, product growth can be positive or negative but is often a sustained pattern. As an additional example, product growth may be substantially constant month-to-month. In contrast, true variation due to factors other than product growth, such as daily manufacturing output, may be substantially unpredictable. By removing the observable or pre-determinable variation from a set of usage data values, the variation (e.g., true variation) of the adjusted data values may be analyzed. Such analysis may identify true variation and may be utilized to mare accurately calculate target inventory levels.

Identifying observable or pre-determinable variations may include fitting a function to the plurality of component usage data values to characterize those values. Furthermore, a portion of this function may then be removed from each component usage data value to generate each adjusted usage data value. The pre-determinable/observable variation may include one or more of: seasonal variations, product sales growth variations, product sale reduction variations, expected variations due to marketing and/or product life cycle variations.

Analysis of the plurality of adjusted data values may be performed to produce a statistical variation amount. This statistical variation amount may then be utilized to produce the target inventory level. For instance, the statistical variation amount may be added to a base inventory level to account for day-to-day variation of inventory component usage.

According to another aspect of the present invention, a method for use in an inventory control system is provided that includes identifying a supplier lead-time period for an inventory component and summing daily usage data for the inventory component for a plurality of at least partially non-overlapping time periods. The time periods may each be equal in duration to the supplier lead-time period. The result may be the generation of a plurality of lead-time usage data points. These lead-time usage data points may then be statistically analyzed to identify a statistical variation amount. Finally, a target inventory level may be produced that includes the base inventory amount and the statistical variation amount.

In one arrangement, a base inventory level may be calculated from historical usage data that includes at least one of the daily usage data and/or the plurality of lead-time usage data points. In this regard, an average over a given time period may be utilized as a base inventory level, or a function that characterizes the historical data may be utilized to forecast the base inventory level. Alternatively, the base inventory level may correspond to general sales/consumption forecasts.

In one arrangement, statistically analyzing the plurality of lead-time usage data points may include calculating a standard deviation of the lead-time data points. Further, the number of standard deviations that correspond to a desired service level for the component may be utilized for determining a statistical inventory amount target inventory level. That is, if a 99.5% customer service level were desired, a standard deviation includes 99.5% of the lead-time data usage points may be utilized. Accordingly, any desired service level may be selected by a user of the system.

BRIEF DESCRIPTION OF THE DRAWINGS

FIG. 4 is a table illustrating a historical usage matrix.

FIG. 5 is a table illustrating component information.

FIG. 7 is a table illustrating historical usage and lead-time usage.

FIG. 11 is a table illustrating the calculation of a statistical inventory.

FIG. 12 is a table correlating service level factors to service level.

DETAILED DESCRIPTION

Reference will now be made to the accompanying drawings, which assist in illustrating the various pertinent features of the embodiments. Although the invention will now be discussed primarily in conjunction with a lean flow inventory management system for manufacturing businesses, it should be expressly understood that the embodiments are applicable to other inventory management settings. For instance, one or all aspects of the embodiments may be applied to inventory management of retail businesses. In this regard, the following description of an inventory management system is presented for purposes of illustration and is not intended to limit the embodiments to the form or applications disclosed herein. Consequently, variations and modifications consummate with the following teachings, and skill and knowledge of the relevant art, are within the scope of the embodiments.

Disclosed herein is a lean flow inventory management system that utilizes a statistical inventory sizing method to optimize inventory of on-hand and/or on-order components. Stated otherwise, the system is operable to determine a number of target inventory levels for the on-hand and/or on-order components. As utilized herein, the term 'component' may include any item which may be inventoried for subsequent sale and/or use in, for example, a manufacturing process. Non-limiting examples may include finished goods, individual parts utilized to produce finished goods and raw materials.

System Architecture

Figure 1:
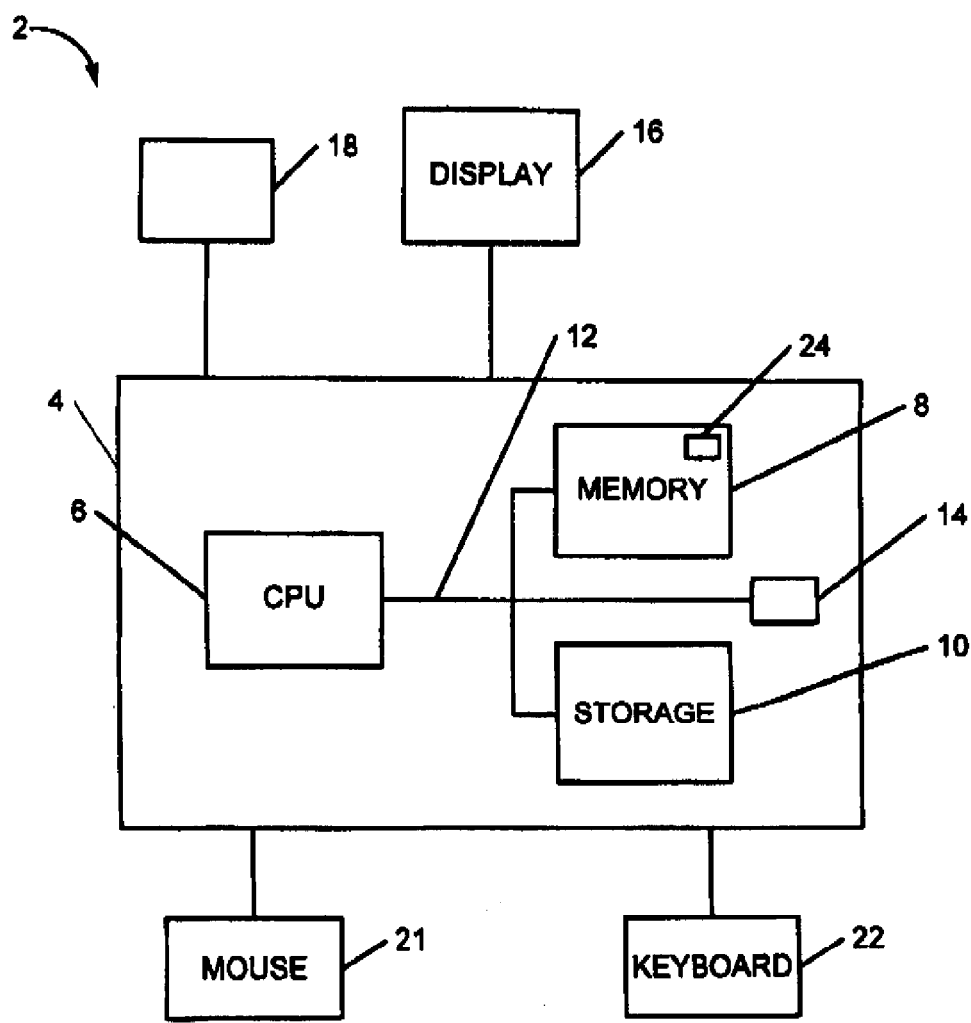
FIG. 1 is a block diagram illustrating a computing system usable with various embodiments of the present invention.

FIG. 1 is a block diagram of the architecture of a computing system 2 usable with the inventory management system and methods disclosed herein. The computing system 2 may include a computing device 4 which may be in the form of a personal computer, a laptop, a portable computing device, server, or any other computing device that is generally programmable. The computing device 4 further may include a processor (e.g., central processing unit) 6 and a computer memory 8 (e.g., RAM). The computer memory 8 stores data and instructions and the processor 6 executes instructions and processes data from the computer memory 8. The processor 6 may retrieve instructions and other data from storage device 10 (e.g., hard drive) before loading such instructions and other data into the computer memory 8. The processor 6, computer memory 8 and storage device 10 may be connected by a bus 12 in a conventional manner.

The computing device 4 may include at least one computer communications interface 14 which may be in the form of a Universal Serial Bus (USB) compliant port. The USB is a known standard for interconnection between various electronic devices. In other embodiments, the computer communications interface 14 may also include serial ports, parallel ports, PS/2 ports or other interfaces suitable for connecting electronic devices to the computer. Further, the computer communications interface 14 need not be a physical connection interface; it may be, for example, a BLUETOOTH interface, infrared or laser communication interface. Computer communications interface 14 may also be connected to the processor 6.

The computing system 2 may also include one or more peripheral devices. For instance, the computing system 2 may include a graphical user interface 16 or GUI (e.g., display screen, LCD) and speakers 18 for presenting content to the user. If the computer 4 is a portable computing device, the GUI 16 and speakers 18 may be smaller or even integrated into each other. In some embodiments, the computing device 4 may include a screen only (such as the case with most PDA's). The computing device 4 should include or be connected to at least one interface for presenting content to a user as sensory data (e.g., sound, visuals, or both). Moreover, the computing system 2 may include a mouse 21 (e.g. wired, wireless) and/or a keyboard 22 and/or a stylus (not shown) for allowing a user to interact with the computing system 2 and/or cause the display of images on the GUI 16. Furthermore, the computing device 4 may also include many additional components, a network card for connecting the computing device 4 to one or more networks, a CD drive, a DVD drive, a power supply, a mother board, video and sound controllers, etc. Such components have been omitted for the sake of brevity.

The computer memory 8 may further include any appropriate operating system 24 to manage the execution of programs as well as various input/output functions. The operating system 24 may be one of the currently available operating systems, such as WINDOWS XP offered by Microsoft Corp., LINUX offered by various distributors, including Red Hat, Inc., or OS X offered by Apple Computer. The operating system 24 may also be an operating system suited for portable or embedded computing devices, such as PALM OS offered by PalmSource, Inc.

As will be described below, the inventory management system and methods disclosed herein may be usable with the computing system 2 to allow users to interact with the inventory management systems and methods and to display inventory management information to such users.

Techniques for Determining Target Inventory Levels of a Component

Figure 2:
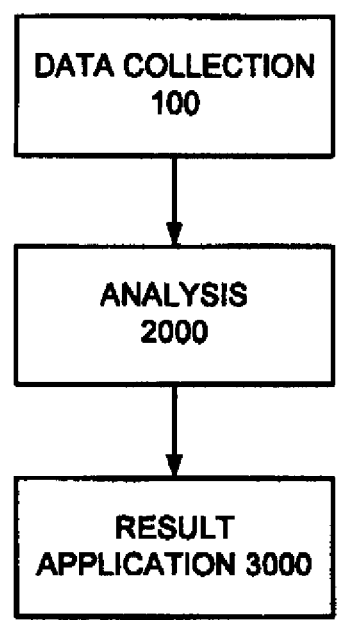
FIG. 2 is a flow chart illustrating one manner of conducting inventory management of the present invention.

In view of the above factors, the inventors have devised a statistical inventory management system and a number of techniques that optimize inventory investment in view of a number of different factors. Generally, the system and techniques determine an optimal component replenishment frequency and may determine this frequency inventory level in view of the lead-time usage variability of the component. This information may be based on actual historical usage data and/or forecasted data (e.g., sales growth forecasts). In this regard, the system and techniques disclosed herein analyze historical production and/or consumption data and/or forecast data for a component and conduct one or more mathematical analyses to determine fluctuations in usage over time within a supplier lead-time for the component. Resulting calculations generate target inventory levels that may ensure there will be enough material on hand and/or on order to meet a specified service level. As shown in FIG. 2, the overall system includes three general steps: data collection 1000, analysis 2000 and result application 3000. Each of these steps is more fully discussed herein.

Figure 3:
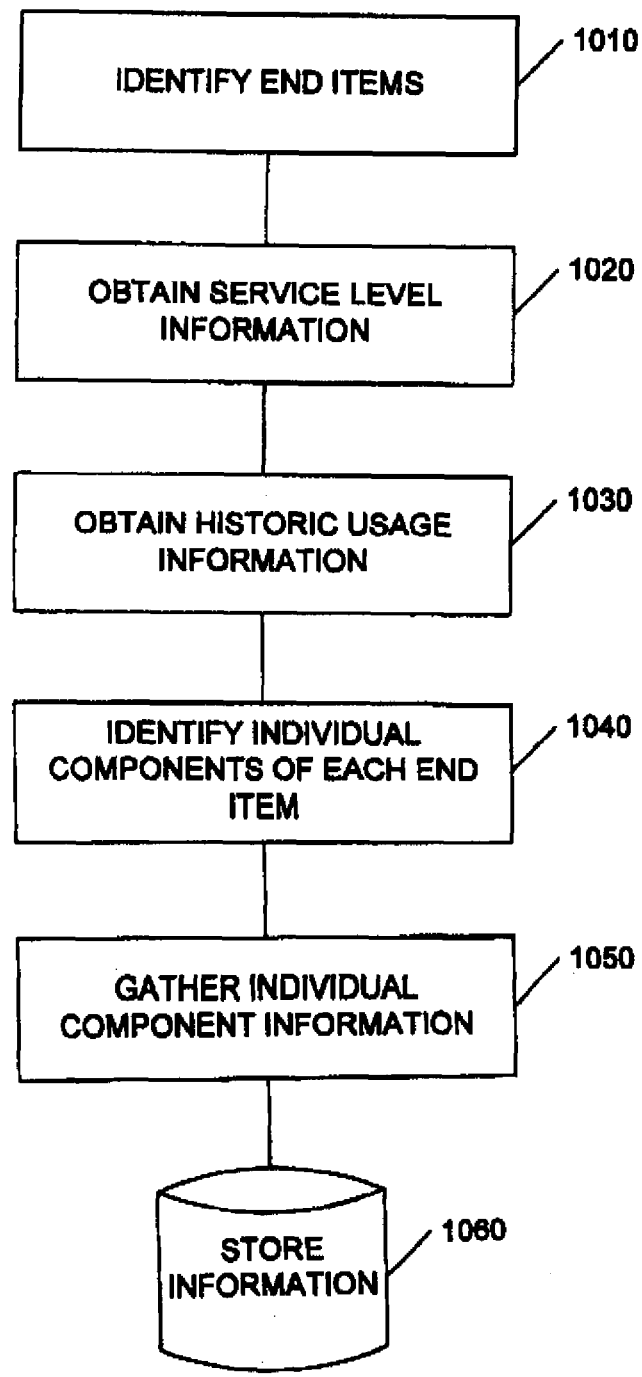
FIG. 3 is a flow chart illustrating data collection usable with the flow chart of FIG. 2.

Data Collection:

Information regarding each component utilized by an entity (e.g., manufacturing retailer) must be identified such that statistical inventory sizing of the inventory of that component may be performed. FIG. 3 illustrates a flowchart of steps that may be performed to obtain appropriate data or information for performing the below described analysis. Initially, products or "end items" (e.g., semi finished or finished products) sold to a customer may be identified in step 1010. That is, end items sold to customers may be identified by, for example, a part number. Supplementary information regarding each end item may also be obtained and may include obtaining service level information in step 1020 and obtaining historic usage information in step 1030 for each end item.

The service level information collected in step 1020 is usually expressed as a percentage, based on a strategic decision balancing the cost of inventory investment versus the cost of not having on-hand availability for a given end item. This may be determined by a user of the system. The end item service level may match the company's desired customer satisfaction target such as, for example, an on time delivery target, an order fill rate target, etc. As a non-limiting example, a 99% on time delivery target service level would mean that a company's goal or target was for 99% of the company's customers to experience an on time delivery.

In step 1030, historical usage data may be obtained for each end item and may include sales or production of a given end item in any appropriate increments (e.g., daily, weekly, monthly). It may be desirable to have as many data points as are available to increase the accuracy of the analysis. In one embodiment, it may be preferred to have at least 26 data points available to provide a better statistical data set for use in subsequent analysis. In another embodiment, this data may be saved in a matrix (see FIG. 4) with the end items (e.g., Part A and Part B) down a left hand side of the matrix and calendar dates across the top (left to right). The matrix may then be filled with daily usage data to provide numerous data points with increased granularity for subsequent analyses.

Optionally, forecast data may be gathered (not illustrated) for one or more end items as well. Such forecast may be directed to anticipated growth, seasonal growth, decline, etc. As a non-limiting example, forecast data may be gathered in monthly increments for a period of about one year. The availability of forecasting data may depend upon the end items. For instance, in some markets there may be a wealth of available forecast information available (e.g., clothing retail, food retail and holiday sales) while in other markets such forecast information may not be available.

Once an end item is identified, the individual components of that item may be identified in step 1040. For instance, such individual components may be identified from a "bill of materials" (BOM) associated with an end item (a formal list of the components utilized to produce the end item). Typically, a BOM will list the components with a name, reference number, a quantity necessary for the end item and one/one or more units of measure/tolerances, etc., and may be in the form of an engineering BOM and/or a manufacturing BOM.

Once each individual component of each end item is identified, information for each component may be gathered in step 1050. As shown in FIG. 5, each individual component may be identified by a part number 111, 222, 333, 444 and various types of information may be tabulated in a table 20 for each component 111-444. As shown, a target service level 30 of each component 111-444 may be included within the tabulation. Generally, the target service level 30 of each component should be greater than the desired service level of the end item (see discussion above of step 1020). That is, if any one individual component 111-444 becomes unavailable, the end item cannot be produced.

In one arrangement, the target service level 30 of each individual component 111-444 may be derived based on the end item service level. The target service level 30 may be calculated by taking a root value of the end item service level based on the number of individual components used to produce the end item. For instance, if an end item includes four components, the target service level 30 of each component will equal a fourth root of the end item service level. By way of further example, if the end item has a desired service level of 95% and there are 20 components that are utilized to manufacture the end item, then the target service level 30 of each component is 0.997 or 99.7% (e.g., the 20th root of 0.95).

A supplier lead-time 40 may also be identified for each component. See FIG. 5. The supplier lead-time 40 for each component 111-444 may be in the same time units as the historical usage or forecast data of the end item. For instance, if the historical usage data is in days it is preferred that the supplier lead-time also is in days. A minimum order quantity 50 (MOQ) may also be identified for each component 111-444. The MOQ is the minimum quantity available for purchase from a particular supplier, and thus the size of a replenishment order for a given component should meet the minimum quantity as dictated by the supplier. A unit cost 70 may also be identified for each component 111-444. The unit cost 70 represents the material cost of each individual component and can also include labor and overhead costs.

As shown, a priority determination 60 may also be made for each component 111-444. This priority determination 60 may dictate whether statistical inventory sizing will be performed for a given component 111-444. In one arrangement, the priority determination 60 may comprise an ABC segmentation or "Pareto" analysis. In this regard, all components of an end item may be sorted by cost. The components may then be classified in a scheme that ranks the component based on annual usage multiplied by cost/price. For instance, A items may be components in which the total number of such components used is in the top 20% of all components used for the end item and accounts for 60-70% of the dollar volume of all components used for the end item. B items may account for the next 20-25% of the number of components and 20-30% of the dollar volume, and C items may account for the remaining 60-70% of the number of components and only 15-30% of the dollar volume.

The ABC categories may then be used in specifying the amount of attention in terms of control paid to certain components. For instance, target inventory level analysis or statistical inventory sizing may be performed for A items and not for B or C items. Specifically, the Pareto analysis may indicate that the acquisition costs for frequent replenishment of the B and C items may outweigh the benefits of maintaining lean flow inventories permitted by statistical analysis. Of course, other variations may exist for prioritizing different components. Referring back to FIG. 3, the data associated with each end item and each individual component may be stored in a database or other appropriate device or in other manners in step 1060. For example, the usage data may be stored in a computer readable medium (e.g., the storage device 10 of the computing device 4) in the form of an array of usage data points that may be subsequently analyzed.

The acquisition of the information discussed in conjunction with FIG. 3 may be repeated for each end item. Of note, different end items may utilize common components. Accordingly, information for common components may be compiled to provide an overall usage of a given component. Accordingly, statistical inventory sizing, as set forth herein, may be performed for a component that is utilized to produce two or more end items.

Figure 6:
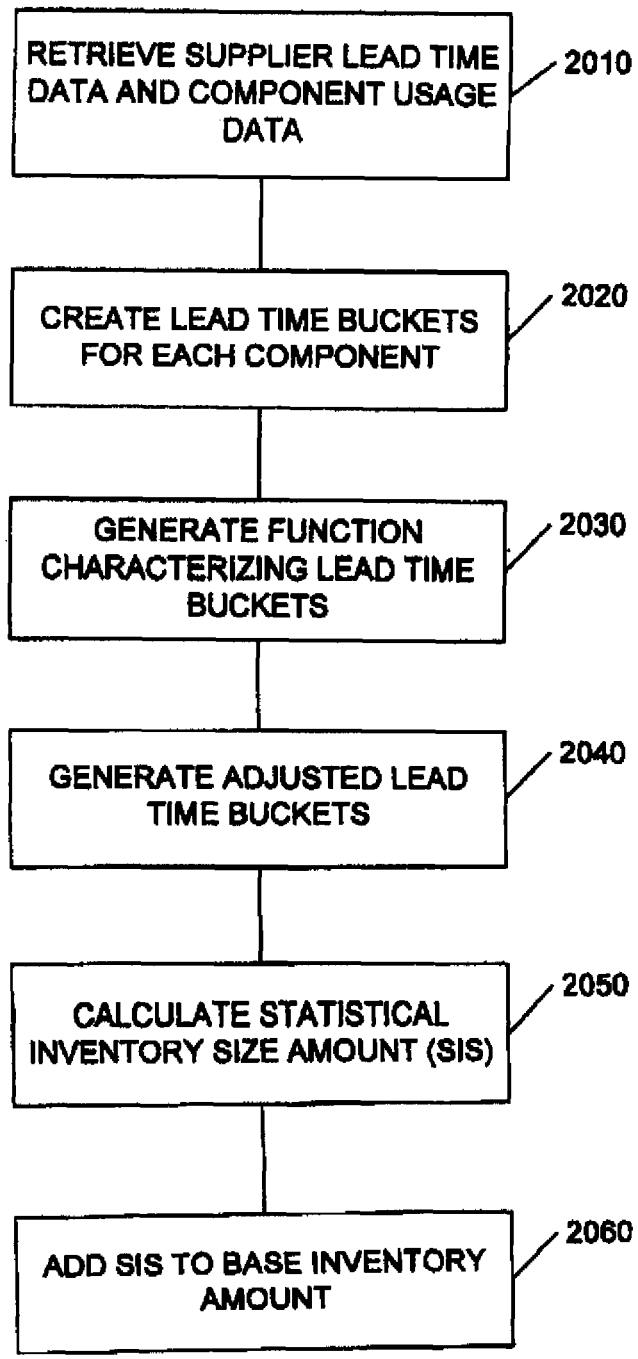
FIG. 6 is a flow chart illustrating analysis of the data usable with the flow chart of FIG. 2.

Analysis:

Once the data collection is completed or has at least begun, the data may be analyzed in numerous manners by the processor 6 of the computing device 4 to produce statistical inventory sizing for a given component. Stated otherwise, such data analysis will produce a number of target inventory levels that may, when the total number of on-hand and on-order components falls below such at least one of such target inventory levels, indicate that a replenishment order should be made such that the total number of on-hand and on-order components at least substantially equals at least one of such target inventory levels. FIG. 6 broadly illustrates one manner of analysis 2000 of the collected data. Initially, usage and supplier lead time information may be retrieved in step 2010 from the database (e.g., storage device 10) or other location for each component. As previously discussed, the component usage information may be historical and/or forecast usage information for each component. For instance, usage data for the end item(s) in which the component is utilized may be multiplied by the number of components utilized for each end item(s). In other embodiments, usage data for each respective component of the end item may be available.

In any event, the retrieved data may be utilized to create lead-time usage data (e.g., lead-time buckets or groups) for each component that a statistical analysis will be performed on in step 2020. For instance, each lead-time bucket (e.g., data point) may be a summation of the usage data for the component over or across a particular time period. In one embodiment, the time period may be equivalent to the supplier lead-time for each component. Data corresponding to the lead-time buckets may then be tabulated. As illustrated in FIG. 7, assume a first component (e.g., Part A) has a supplier lead-time of 7 days and a second component (e.g., Part B) has a supplier lead-time of 3 days. For Part A having a seven day lead-time, the first seven daily usage entries (in the example of FIG. 7, the usage information is historical as opposed to forecast) may be summed to provide a first lead-time bucket on May 7 that corresponds to usage from May 1 through May 7. On May 8, daily usages from May 2-May 8 are summed to provide a second lead-time bucket. The same procedure or process may be followed for Part B except that three day summations corresponding to the three day supplier lead-time of Part B are utilized for the lead-time bucket calculations.

Figure 8:
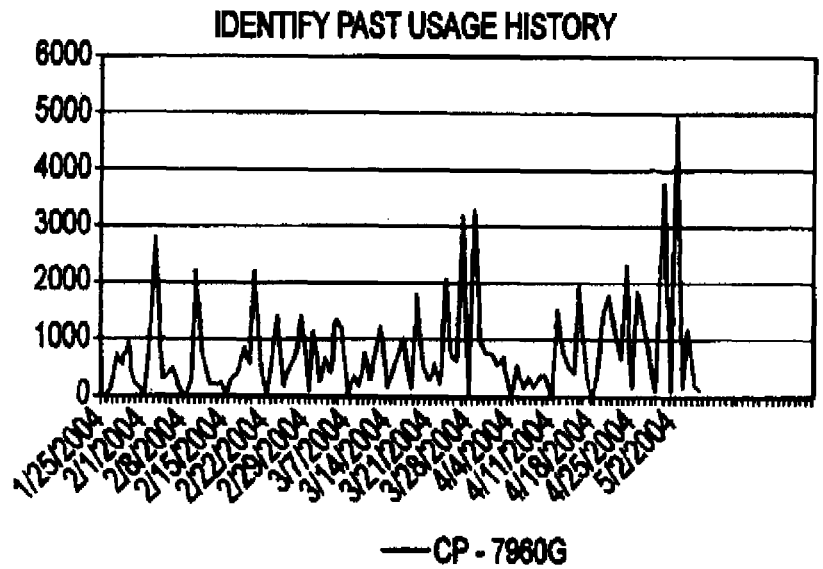
FIG. 8 is a plot showing daily usage variance.
Figure 9:
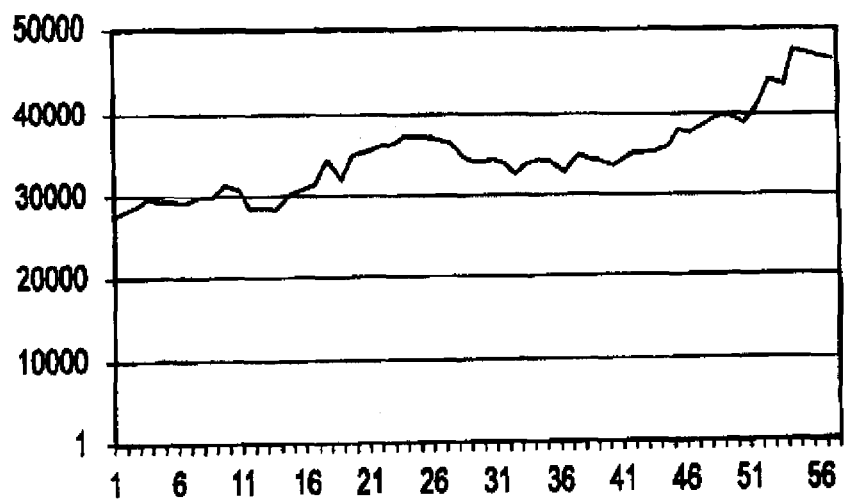
FIG. 9 is a plot showing lead-time usage.

Use of the lead-time buckets allows for the smoothing of usage data (e.g., daily, weekly, monthly) of a given component which may increase the accuracy of any subsequent target inventory level analyses. For example, FIG. 8 illustrates the daily usage of an exemplary component utilized in the manufacture of an end item. As shown, there is a large variance in the daily usage. In contrast, FIG. 9 shows a plot of lead-time buckets corresponding to the component of FIG. 8. As shown, the high variability of the daily usage may be smoothed into a less variable plot which may be utilized for statistical inventory sizing of the component. Once grouped into lead-time buckets in step 2020, the manner of analysis of FIG. 6 may continue.

Figure 10:
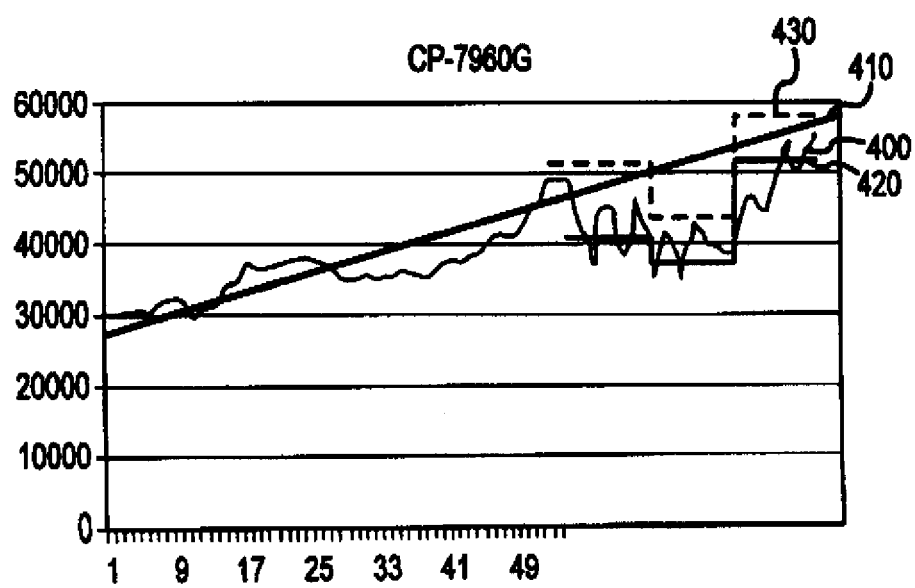
FIG. 10 is a plot illustrating inventory forecasting.

To provide statistical inventory sizing for a component, a function characterizing the lead-time buckets may be generated in step 2030. Such a function may allow for identifying a variation over a time period associated with the lead-time buckets. In one arrangement, generating the function may include performing a slope analysis on a plot of the lead-time buckets. For instance, the slope analysis may include performing a linear regression to fit a line to the lead-time buckets. As illustrated in FIG. 10, a number of lead-time buckets, each lead-time bucket corresponding to summed historical daily usage of a component is illustrated by line 400. A linear regression analysis may then be performed on the lead-time bucket line 400 which results in sloped line 410. As will be discussed herein, the function of the sloped line 410 may be utilized for inventory calculation purposes (e.g., inventory forecasts). It will also be appreciated that the function may be appropriately determined in other manners such as statistically, empirically, and measured.

As will be described more fully below, identification of the sloped line 410 may allow for identifying growth or reduction of volume (e.g., negative growth) across the lead-time buckets that may be attributable to factors other than day-to-day variation. For example, such variation may be attributable to one or more factors such as seasonal demand, product acceptance, product life cycles (e.g., product phase out), and growth. In any case, by identifying growth or reduction over the lead-time buckets (e.g., the slope of line 410), the increase or decrease due to this variation may be removed from each lead-time bucket. As illustrated in FIG. 6, this allows for generating adjusted lead-time buckets that are free of growth or reduction that may be caused due to factors other than day-to-day variation in step 2040.

Stated otherwise, when looking at inventory demand, two factors often cause changes which may be considered. One factor, growth, may be positive or negative (e.g., reduction) but is typically a sustained pattern showing a month over month change in demand. Thus, growth is typically a predictable change. Another factor, "true variation," is the unpredictable nature of inventory use patterns. For instance, a business may know what customers will order on average but may not know what they will order day to day. When doing a statistical review, it may be desirable to identify this true variation free of growth.

To focus in true variation free of growth, a well accepted technique for determining growth (e.g., the above described linear regression of the lead-time bucket data) may be performed. As an example, the slope generated as a result of a linear regression analysis may be equated to a 10% per annum growth or demand pattern. It will be appreciated that the slope can be equated to positive or negative growth in any appropriate manner. In some embodiments, this 10% variation does not need to be considered as part of the true variation and may be removed from the analysis. Thus, each of the lead-time buckets may be appropriately adjusted according to the slope which essentially flattens out the growth from the resulting "adjusted" lead-time buckets. At this point, the adjusted lead-time buckets may only show true variation, which now may be statistically analyzed to identify one or more target inventory levels.

In some embodiments, a projected growth amount for each time period of usage may be determined. For instance, the slope determined from the linear regression analysis may be multiplied by the supplier lead time for a particular component to generate a projected growth amount over KRT usage. As another example, the slope line may be extended out at an x-axis distance equal to the supplier lead time, and the y-axis or lead-time increase or decrease over this x-axis distance may be equated to the projected growth amount. The projected growth amount may be a positive or negative value depending upon the value of the slope of the linear regression analysis.

After generating adjusted or non-adjusted lead-time buckets for at least one component, a base inventory amount and a statistical inventory (e.g., variance) amount may be calculated, the combination or summation of which equals the target inventory level of the component. Stated otherwise, the statistical inventory amount may be an amount of inventory for a component in addition to the base inventory amount that needs to be on-hand and/or on-order to ensure that an end item service level is maintained. For instance, in one arrangement, a base inventory amount may be determined by identifying an average over the adjusted or non-adjusted lead-time buckets and using this average as the base inventory amount. As shown in FIG. 10, use of simple averaging of the adjusted or non-adjusted lead-time buckets to establish a base inventory amount is illustrated by line 420. As illustrated, the line 420 may consist of a series of steps composed of horizontal and vertical portions. Each horizontal portion may run through or connect similarly situated portions of the non-adjusted lead-time bucket line 400. Such a procedure may increase the accuracy of the resulting target inventory amount.

Other manners of drafting or calculating the base inventory line 420 are contemplated. For instance, the base inventory line 420 may be a simple horizontal line equivalent to the average across all of the lead-time buckets, or an average may be taken across the most recent lead-time buckets. Alternatively, a function defining one or more of the buckets may be defined and utilized to calculate a base inventory level. For instance, the function may define a slope of the line corresponding to the lead-time buckets. It will also be appreciated that the function may be at least one of statistically based, empirical, or measured.

The equation of the line may also be utilized to forecast the base inventory level for an upcoming time period. Of note, such a "statistical forecast" may be based upon historical usage and/consumption rather than general sales forecasts, which may be influenced by factors such as, for example, sales goals, marketing projections, etc. Stated otherwise, general sales forecasts are often based on non-supported or minimally supported conjecture whereas statistical forecasting utilizes actual quantifiable data. Of course, in instances where no data is available, general sales forecasts may be utilized to establish a base inventory level. For instance, a number of data points corresponding to forecasted sales numbers for a particular component may be tabulated according to any appropriate time period (e.g., weekly, monthly), and such data points may be statistically analyzed to establish a base inventory level as will be further described below. Different methods may be preferable for different products and/or components.

As shown, the base inventory line 420 may sometimes be below the non-adjusted lead-time bucket line 400. Without a cushion inventory (e.g., a statistical inventory or variance amount), there may be a component shortage each time base inventory line 420 is below the non-adjusted lead-time bucket line 400 as the supplier lead time would prevent the manufacturer or other user of the component from obtaining additional components before the present inventory drops to unacceptable levels. To prevent such component shortages, the additional statistical inventory amount may be added to a base inventory amount and may generally be an amount of inventory allowing for additional usage above and beyond an average usage amount or in other words the base inventory amount.

The additional statistical inventory amount may be calculated in step 2050 from the adjusted or non-adjusted lead-time buckets. If the additional statistical inventory amount is determined using the adjusted lead-time buckets, it may be possible to avoid over-estimation of the additional statistical inventory amount. That is, by removing the slope from the lead-time buckets (which may correspond to long term growth/reduction), the variance between individual lead-time buckets may be reduced. This variability may be in part what determines the additional statistical inventory.

Referring to FIG. 11, elements of the statistical inventory amount calculation are illustrated for a component. In the top row, a series of lead-time buckets is shown, each lead-time bucket corresponding to a four-day supplier lead time. An average $\mu$ for a plurality of lead-time buckets may be calculated, and this average (68.4 in the present example), may be equivalent to the base inventory amount or value. In any case, the standard deviation "$\sigma$" of the plurality of lead-time buckets may be appropriately calculated or identified and the service level "SL" of the component may be determined.

Continuing, a service level factor "x" may be identified and then multiplied by the standard deviation to obtain the additional statistical inventory amount. The service level factor x is the number of standard deviations $\sigma$ in which a predetermined percentage of the lead-time buckets fall. For instance, the predetermined percentage may be equated to the service level of the component. As shown in FIG. 12, the service level factor x may be correlated to a service level chart. Referring back to FIG. 11, a service level for the component of 99.9% is illustrated as being required. The service level factor in which 99.9% of the lead-time buckets falls is 3.09, or therefore 3.09 standard deviations. See FIG. 12.

For purposes of the calculation as shown in FIG. 11 a rounded value of 3 is utilized for the service level factor. Multiplying the standard deviation (e.g., 5) by the service level factor (e.g., 3) results in an additional statistical inventory amount (e.g., 15). This additional statistical inventory amount may be added to the base inventory level to provide a statistical cushion. Once the additional statistical inventory is calculated in step 2050, it may be added to a base inventory level to establish a desired or target inventory level in step 2060.

As shown in FIG. 10, when the statistical inventory amount is added to the base inventory 420, the result is a target inventory line 430 (e.g., a target inventory). As shown, the target inventory line 430 is greater than the actual usage line 400 at all times. However, it will be further noted that the target inventory line 430 is at times less than the slope line 410. In this regard, utilization of the target inventory amount may at times reduce the amount of on-hand inventory in relation to slope forecasting. In any case, the target inventory may maintain enough inventory on-hand to allow for variations in actual usage.

Figure 13:
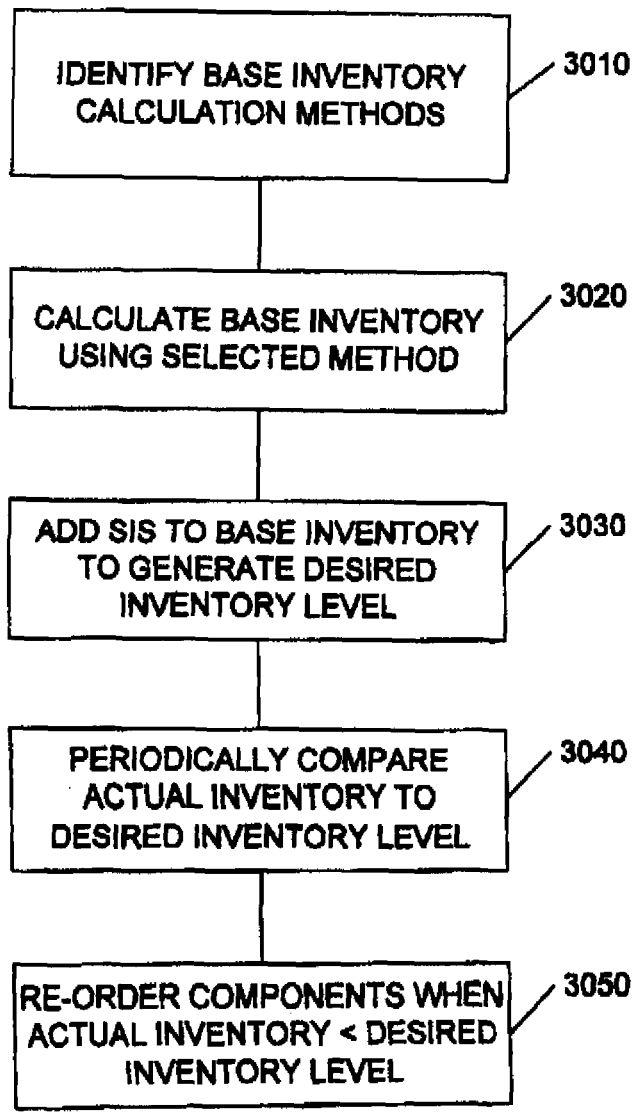
FIG. 13 is a flow chart illustrating application of the analysis usable with the flow chart of FIG. 2.

Result Application:

As previously discussed, the base inventory amount may be added to the statistical inventory level to generate a target inventory amount. As illustrated in FIG. 13, a base inventory calculation method may be selected in step 3010 and the base inventory amount may be calculated in step 3020. The statistical inventory amount (SIS) may then be added to the base inventory amount or level in step 3030. The resulting target or desired inventory level (e.g., reorder point) may then be periodically compared to actual on-hand and/or on-order inventory in step 3040. Once the balance of on-hand inventory and/or on-order inventory for a particular component dips below the desired inventory level, a replenishment order may be issued (e.g., to a component supplier). Such a replenishment order may be appropriately issued manually or by one or more components of the previously described system 2. For instance, upon determining that the balance of on-hand inventory and/or on-order inventory for a particular component has dipped below a desired inventory level (e.g., target inventory level), the processor 6 of the computing device 4 may issue a command for the GUI 16 to display a pop-up message regarding the shortage or else for an automated message (e.g., email) to be generated and sent to one or more email addresses of various users. In other embodiments, the processor 6 may issue a command for an auditory signal to be generated (e.g., alarm, chirp).

Summary of Target Inventory Level Techniques:

1) Historical ROP:

A historical ROP may be determined initially by establishing a base inventory amount via taking an average across all of the non-adjusted lead-time buckets. The statistical inventory (e.g., variance) amount may be determined or ascertained as previously described using the non-adjusted lead-time buckets. Thereafter, the base inventory amount and the statistical inventory amount may be added (e.g., summed) together to obtain the Historical ROP or target inventory level. As this technique typically utilizes only historical data, it may be advantageous in determining target inventory levels for products with little growth.

2) Slope Adjusted Historical ROP:

A Slope Adjusted Historical ROP may be determined similar to the manner in which the Historical ROP was determined except that adjusted lead-time buckets are used as part of the calculations (e.g., for determining base inventory and variance amounts) instead of non-adjusted lead-time buckets. The Slope Adjusted Historical ROP may advantageously predict target inventory levels for components that experience one or more periods of growth but which periods then plateau or otherwise level off.

3) Slope Projected Historical ROP:

A Slope Projected Historical ROP may be determined by adding the Slope Adjusted Historical ROP to a projected growth amount for the particular component. As previously discussed, this amount may be a projected growth in usage (either positive or negative) of the component for each time period. The Slope Projected Historical ROP may be useful in determining target inventory levels for components whose historical growth or decline may be predicted to continue into the future.

4) Forecast ROP:

A Forecast ROP may be determined by analyzing forecast data points (e.g., component usage data indicative of forecasted consumption) for the particular component to establish a base inventory amount. For example, after determining the appropriate supplier lead-time for the particular component (e.g., 4 weeks), an average component forecast (e.g., sales forecast) may be calculated in the same units as the determined supplier lead-time (e.g, weekly average). Thereafter, the base inventory amount may be determined by multiplying the average component forecast by the supplier lead-time. The statistical inventory amount may be ascertained as previously described using non-adjusted lead-time buckets. The base inventory amount and the statistical inventory amount may then be added together to obtain the Forecast ROP or target inventory level. This target inventory level technique may be useful for products with little growth but where a known factor will be taking place (e.g., large sale).

5) Slope Adjusted Forecast ROP:

A Slope Adjusted Forecast ROP may be determined similar to the manner in which the Forecast ROP was determined except that adjusted lead-time buckets are used as part of the calculations of the statistical inventory amount instead of non-adjusted lead-time buckets. This target inventory level technique may be useful for products with growth potential (e.g., new product introduction), that will decline (e.g., end of product lifetime), or where a known factor will take place (e.g., large sale).

User Interfaces

With reference back to FIG. 1, the computing system 2 may be operable to implement the various inventory management techniques and systems disclosed herein. For instance, a computer readable medium (e.g., storage device 10) may appropriately store component usage data indicative of a magnitude of at least one of historical and forecasted consumption of at least one component during a time period in addition to a target inventory module that may be employable to determine a number of target inventory levels for the component. As previously discussed, the target inventory levels may be determined at least in part by analyzing the component usage data. In this regard, the target inventory module may include computer readable instructions or instruction sets (e.g., code) that may be operable to analyze, inter alia, the component usage data points to generate the above described lead-time buckets, base inventory levels, statistical inventory levels (e.g., variance amounts), and ultimately target inventory levels.

A processor (e.g., CPU 6) may appropriately manipulate or otherwise employ the computer readable instructions or instruction sets to determine the plurality of target inventory levels. For instance, each of the plurality of target inventory levels may be determinable by the processor utilizing a selected one of a plurality of different computer readable instruction sets, each of the sets corresponding to one or more of the target inventory levels or inventory level techniques. A display module (e.g., GUI 16) may present one or more user interfaces operable to provide one or more graphical representations or other indications to a user. As will be described below, the GUI 16 may be operable to display information regarding the analysis of the component usage data to generate the target inventory levels.

For instance, the display module or GUI 16 may be operable to provide at least one graphical representation indicative of one or more of raw data (e.g., component usage data), intermediate calculations, target inventory levels, lead-time usage data, etc., as a function of time and in various forms (e.g., graphs, charts) in a manner that may be user interactive (e.g., by way of stylus, mouse, finger, eye gaze, other bodily movement). As such, the user interfaces of the display module may serve to advantageously and efficiently convey relevant and important critical inventory level information to any entity (e.g., manufacturers, retailers) that may be affected by inventory level fluctuations while allowing such entities to interact with the user interfaces "on the fly" to account for changing conditions.

Each of the user interfaces described below may be usable with one or more user interface devices such as a stylus, a hand manipulable point and click device (e.g., mouse), a touch screen device (e.g., allows use of hands and/or fingers), a keyboard, a retinal detection device, voice recognition device, etc. The one or more user interface devices may be operable to control one or more user controllable devices such as various pointing devices (e.g., cursors). The user interfaces may also include various menus, icons, windows, etc. As will be described below, the at least one user interface and controllable devices may be operable allow a user to selectively display one or more graphical representations for one or more components on a display module, and may provide a plurality of user manipulable features for modifying the one or more graphical representations on the user interfaces of the display module.

Figure 14:
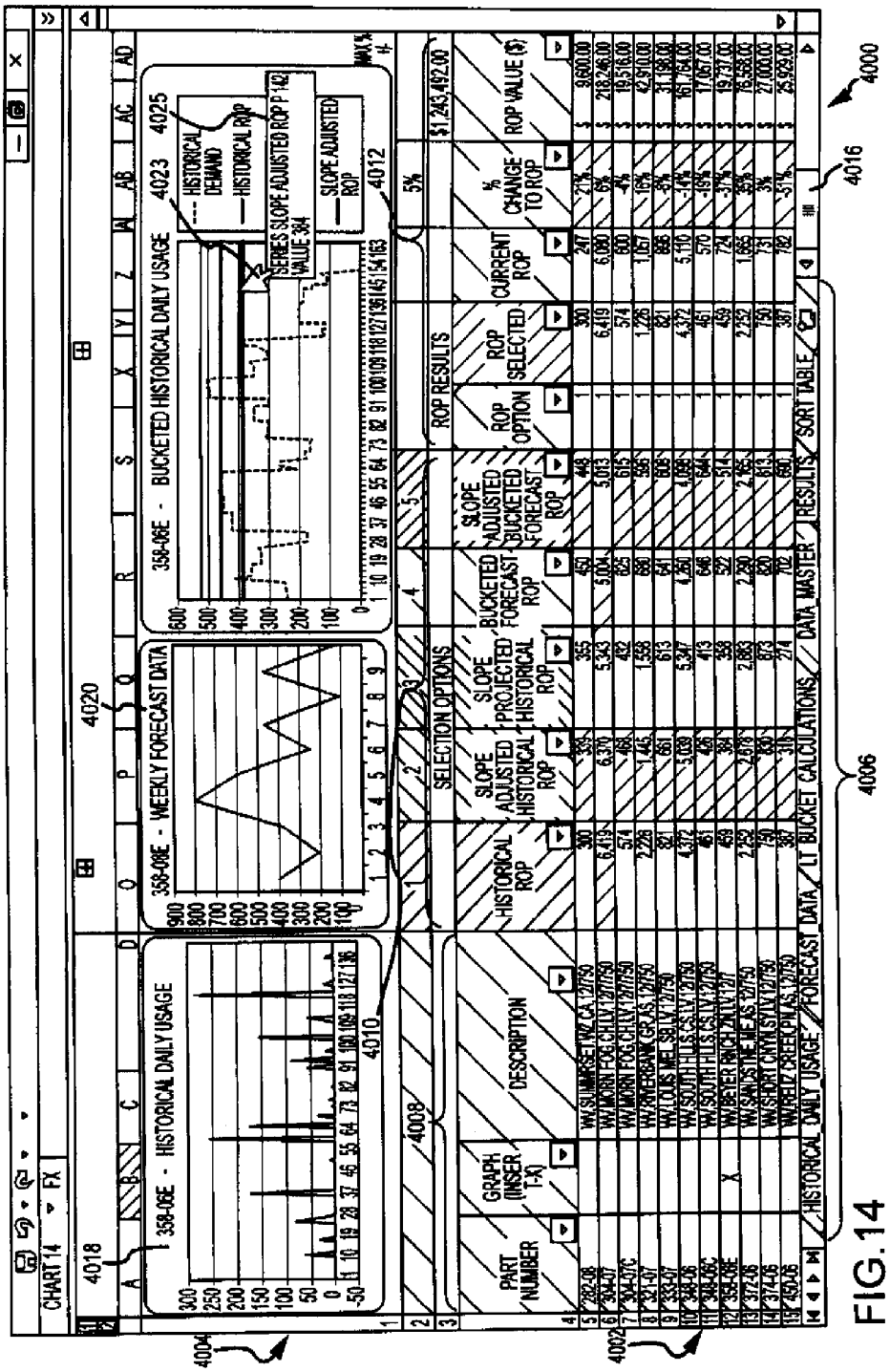
FIG. 14 is a user interface according to one embodiment usable with the display module of the computing system of FIG. 1.

As illustrated in FIG. 14, one embodiment of a user interface 4000 usable as part of the GUI 16 (e.g., display module) is illustrated. The user interface 4000 may include any appropriate number of portions or regions (e.g., display regions) each of which may be operable to convey various types of information to a user and/or allow the user to manipulate the user interface 4000. For instance, the user interface 4000 may include first, second and third display regions 4002, 4004, 4006.

As will be described more fully below, the first display region 4002 may include various textual and numerical information and/or data related to one or more components or end items that may be appropriately manipulated by a user. The second display region 4004 may include one or more graphical representations (e.g., line graphs, pie charts) related to one or more selected components or end items corresponding at least in part to the information located in the first display region 4002. The third display region may include tabs or other features that allow a user to flip or toggle between various other portions of the user interface 4000. Although the first and third display regions 4002, 4006 are illustrated as being located in a bottom portion of the user interface 4000 and the second display region 4004 is located in an upper portion, it will be appreciated that the various display regions (e.g., first, second and third display regions 4002, 4004, 4006) may be situated in any appropriate location (e.g., upper, lower, center) and orientation (e.g., overlapping, non-overlapping) in or on the user interface 4000.

With continued reference to FIG. 14, the first display region 4002 may include one or more sub-regions therewithin. As an example, the first display region 4002 may include first, second and third sub-regions 4008, 4010, 4012. A toggle bar 4016 may allow an operator access to additional sub-regions (not shown) of the first display region 4002. The first sub-region 4008 may include general information related to each component or end item. For instance, the first sub-region 4008 may include one or more columns (not labeled for clarity), each column including one or more cells or rows corresponding to a particular component or end item. Each cell or row of each column may be aligned with the cell or row of an adjacent column such that information in one particular cell or row corresponds (e.g., relates to the same component) to an adjacent (e.g. located to the side) cell or row. A first column may indicate a part number for the component, a second column may be operable to receive a marker (e.g., an "x") or otherwise be selected to modify at least a portion of the second display region, a third column may indicate a lot size for the component, and a fourth column may provide a textual and/or numerical description of the component.

With particular reference to the second column, by utilizing any appropriate user interface device (e.g., keyboard, mouse, finger, stylus) for operatively interfacing with the display module and for controlling any appropriate user controllable device (e.g., pointer, cursor), a user may position a marker (e.g., x) in or otherwise select a cell corresponding to a particular component and cause the display of one or more graphical representations corresponding to such component as a function of time (e.g., target inventory levels, lead-time usage data, forecast or historical consumption data) in the second display region 4004. For instance, upon selecting an appropriate portion of the first display region 4004, the computing device 4 may be operable to access from a computer readable medium (e.g., storage 10), in response to the selecting, component usage data (historical and/or forecasted) for the desired component. Thereafter, a processor (e.g., CPU 6) may create lead-time usage data as previously described and then determine one or more target inventory levels for the desired component(s) from the lead-time usage data using one or more computer readable instruction sets that have been stored in a target inventory module in the storage 10. To cause the display of graphical representations of a different component, the user may appropriately position a marker in or otherwise select a cell in the second column corresponding to such component. In some embodiments, the user may need to delete or otherwise remove all other markers from other cells in the second column.

The second sub-region 4010 may generally provide an indication of any number of target inventory levels corresponding to each component. Similar to the first sub-region 4008, the second sub-region 4010 may include one or more columns, each of the columns including one or more cells corresponding to one or more components or end items. Each of the columns may correspond to one of the target inventory level techniques previously described. For instance, a first column may indicate a historical reorder point (ROP), a second column may indicate a slope adjusted historical ROP, a third column may indicate a slope projected historical ROP, a fourth column may indicate a forecast ROP, and a fifth column may indicate a slope adjusted forecast ROP. Other target inventory level techniques may be included in the second sub-region 4010. Each column may be associated with a color different from that of the other columns and may be appropriately numbered (e.g., 1, 2, 3, 4, 5).

Any appropriate logic may be associated with the user interface 4000 that implements at least some of the previously described techniques in combination with other data in the user interface 4000 (e.g., historical daily usage data and forecast data accessible via the third display region 4006) to populate the various columns within the second sub-region 4010 with the appropriate target inventory level for each component. In this regard, such logic may be operable to automatically populate each cell corresponding to a particular component in the columns of the second sub-region 4010 with the correct and appropriate target inventory level upon the change or modification of other data associated with the user interface (e.g., historical or forecast usage data). As will be described below, one or more of the target inventory levels of the second sub-region 4010 may be displayed in the third display region 4004 upon a user populating a cell in the second column of the first sub-region 4002 with a marker.

The third sub-region 4012 may generally provide an indication of an analysis of a current ROP relative to a selected one of the target inventory levels of the second sub-region 4010. Similar to other sub-regions, the third sub-region 4012 may include one or more columns, each with one or more cells. For instance, one of the columns (e.g. that labeled "ROP SELECTED") may correspond to a selected one of the target inventory levels that a user desires to analyze. The user may find the particular target inventory level for a particular component from the second sub-region 4010 and manually enter such target inventory level in the ROP SELECTED column. Alternatively, the user may find the number corresponding to the target inventory level technique in the second sub-region 4010 (e.g., 1 corresponds to "Historical ROP", 2 corresponds to "Slope Adjusted Historical ROP"), and enter such number in an appropriate cell in another column adjacent to the ROP SELECTED cell, (e.g., the ROP OPTION cell). By entering such number in the ROP OPTION cell, logic associated with the user interface 4000 acts to automatically populate a corresponding cell in the ROP SELECTED cell with the appropriate target inventory level.

The cells of another column of the third sub-region 4012 (e.g., that labeled "Current ROP") may be populated with a current ROP (e.g., a ROP obtained not using target inventory level techniques disclosed herein, one of other target inventory levels disclosed herein) of a particular component. For instance, a current ROP may be appropriately manually entered into a cell in the Current ROP column or else logic associated with the user interface 4000 may be operable to automatically access or obtain a current ROP level from other portions of the user interface 4000, other applications, etc.

The cells of other columns of the third sub-region 4012 (e.g. those labeled "% CHANGE TO ROP" and "ROP VALUE ($)") may be operable to provide a statistical analysis of the data in the ROP SELECTED and Current ROP columns. For instance, the % CHANGE TO ROP column may be operable to calculate the percentage change to the current ROP by implementation of the ROP selected. Moreover, one or more cells in the % CHANGE TO ROP column may be automatically modified in any appropriate manner to provide an indication as to how the percentage change to the current ROP relates to a reference percentage change in the ROP (e.g., a "customer satisfaction level"). For instance, a portion of the % CHANGE TO ROP column may include a user manipulable feature such as the cell at the top of the column populated with "5%" hereinafter referred to as "reference cell". The reference cell may be operable to receive a marker such as a reference percentage change in the ROP that indicates some measure of a customer satisfaction level. In some embodiments, the marker may be manually entered (e.g., via aligning a cursor over the reference cell, clicking a mouse, and using a keyboard to enter the marker) while in other embodiments, the reference cell may include a drop down menu or "up" and "down" toggle arrows to selected a desired marker (e.g., percentage).

Thereafter, appropriate logic may be operable to automatically determine whether a value in each cell in the % CHANGE TO ROP column is above or below the value in the reference cell and provide an appropriate indication in each cell. As an example, upon determination that the value in a cell in the % CHANGE TO ROP column is equal to or above the value in the reference cell, the % CHANGE TO ROP cell may assume a first graphical representation, such as the background of such cell being shaded any appropriate color (e.g., red). Moreover, upon determination that the value in the cell is less than the value in the reference cell, the background of such cell may be shaded a different color (e.g., blue) or else not shaded at all such that the background remains white. In some embodiments, the background of a cell in the % CHANGE TO ROP column may be shaded any appropriate color when the value is equal to or above the absolute value in the reference cell. The % CHANGE TO ROP column advantageously provides an indication to operators, plant managers, and the like of how great of a change to the current or present ROP would be necessary to implement one of the target inventory level techniques disclosed herein. For instance, a manufacturer that does not possess enough capital to maintain a ROP at 30% or more than a current ROP may enter "30%" into the reference cell and look for a cell in the % CHANGE TO ROP column with a white background.

The "ROP VALUE ($)" column may be operable to provide an indication of the dollar value of the quantity of components in the ROP SELECTED column. For instance, logic associated with the user interface 4000 may be operable to obtain the unit cost of a particular component or end item and multiple such unit cost by a corresponding cell in the ROP SELECTED column. Again, such a feature may be advantageous to managers and operators responsible for maintaining inventory levels and monitoring cash flow. It will be appreciated that other types of statistics (e.g., other than just those related to ROPs) may be incorporated into the third sub-region or other sub-regions that include a color-coding or other type arrangement for indicating when one statistic is above, equal to or above, equal to, equal to or below, or below some reference statistic or customer satisfaction level. For instance, the statistic may relate to a percentage of days with usage of the component, a percentage of time that a maximum daily usage percentage of the component is greater than an average percentage of days with usage of a plurality of components, and/or a percentage variation between a historical reorder point and a forecast reorder point.

All of the above-described sub-regions and columns and cells therewithin may be in any location or orientation on the user interface 4000 and may be manipulated, modified or otherwise populated in any appropriate manner. Moreover, one or more of the columns may incorporate other features that may facilitate analysis. For instance, one or more columns may include a "drop-down" arrow (e.g., not labeled, but similar to that at the top of the first column of the first sub-region 4008) that allows an operator to display only particular components. For instance, by clicking on the drop-down arrow located in the top of the first column of the first sub-region 4008, an operator may choose to provide information in the first display region 4002 only related to parts "282-08" and "333-07".

With continued reference to FIG. 14, the second display region 4004 may include one or more graphical representations therein. As previously mentioned, the graphical representations in the second display region 4004 may correspond to the component or end item having a marker populated in its corresponding cell in the second column (e.g., that labeled "GRAPH (INSERT X)") of the first sub-region 4008 of the first display region 4002 (hereinafter referred to as "selected component"). A first representation 4018 may correspond to a graph or chart illustrating historical usage (e.g., daily) of the selected component and may incorporate the previously discussed historical usage data for the component. A second representation 4020 may correspond to a graph or chart illustrating forecast usage (e.g., weekly forecast data) of the selected component and may incorporate the previously discussed forecast usage data for the component.

A third representation 4022 may correspond to a graph or chart illustrating one or more of the target inventory levels from the second sub-region 4010 of the first display region 4002. Moreover, a portion of one or more of the first through the fifth columns of target inventory levels of the second sub-region 4010 of the first display region 4002 may be appropriately distinguished from other columns by way of, for instance, color-coding (e.g., green, pink). The color of the target inventory level in the third representation 4022 may correspond to the color used in the second sub-region 4010 of the first display region 4002. For instance and as illustrated, the "HISTORICAL ROP" target inventory level is associated with a green color both in the second sub-region 4010 of the first display region 4002 and in the third representation 4022. Such a feature may allow an operator to quickly and efficiently scan back and forth between the first and second display regions 4002, 4004. The third representation 4022 may also include any appropriate legend (not labeled) to assist users in interpreting the graph. The various graphical representations of the second display region 4004 may be in any appropriate form (e.g., line, bar, pie), and any appropriate logic may be operable to obtain data (e.g., usage data, target inventory levels) from various portions of the user interface, other applications and storage devices, etc. In some arrangements, an operator may align any user controllable feature such as cursor 4023 (or a finger) over a portion of one of the graphical representations (e.g., lines of the graph) to display a pop-up message 4025 regarding the graphic presentation. In other arrangements, the operator may need to manipulate a user controllable device (e.g., mouse) in any appropriate manner such as single clicking or double clicking to display the pop-up message 4025.

Continuing, the third display region 4006 may include one or more tabs, folder-type icons or the like each of which when manipulated is operable to direct the operator to a different sheet or portion of the user interface 4000. Stated otherwise, the user can toggle between various sheets and applications. As illustrated, the third display region 4006 may include a "HISTORICAL_DAILY_USAGE" tab, a "FORECAST_DATA" tab, a "LT_BUCKET_CALCULATIONS" tab, a "DATA_MASTER" tab, and a "RESULTS" tab. The first and second display regions 4002, 4004 previously described correspond to the "RESULTS" tab. An operator may appropriately manipulate the various tabs to view, obtain, enter or otherwise manipulate various types of data, an analysis of which can be viewed within the above described RESULTS section. For instance, by manipulating (e.g., clicking) on the HISTORICAL_DAILY_USAGE tab, an operator can enter historical usage for one or more components which may be utilized by a processor (e.g., the processor 6 of the system 2) along with appropriate logic or code to obtain the target inventory levels, graphical representations and the like of first and second display regions 4002, 4004. In one arrangement after viewing a spiked data point on the "HISTORICAL DAILY USAGE" graph (the first graphical representation), an operator can click on the HISTORICAL_DAILY_USAGE tab and then remove the spiked data point from the user interface 4000 in an effort to obtain a more accurate analysis.

Figure 15:
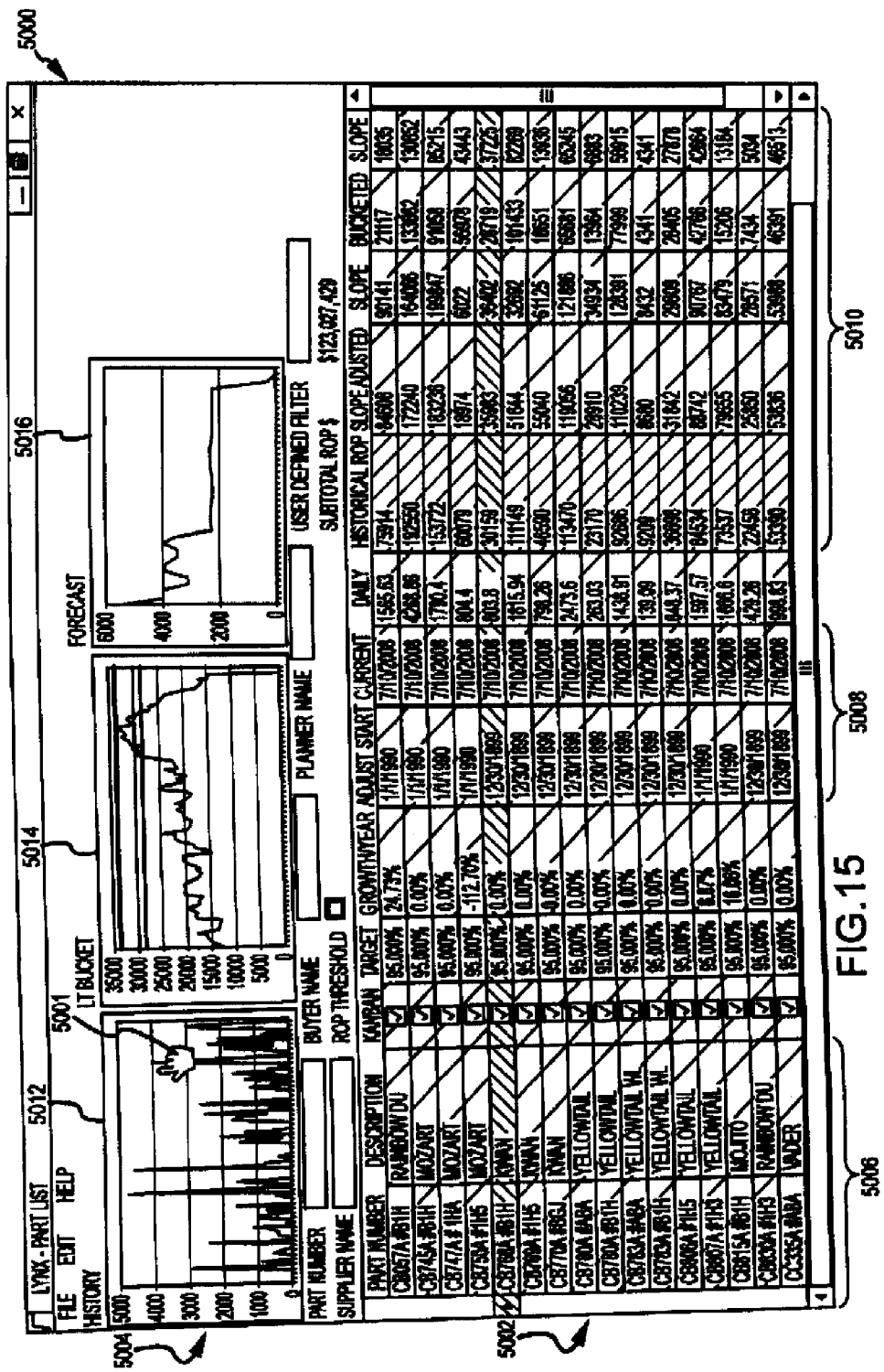
FIG. 15 is a user interface according to another embodiment usable with the display module of the computing system of FIG. 1.

With reference to FIG. 15, another embodiment of a user interface 5000 usable as part of the GUI 16 is illustrated. The user interface 5000 may include any appropriate number of menus, icons, pointing devices (e.g., cursors) and/or windows and may be manipulated in any appropriate manner. The user interface 5000 may also include any appropriate number of regions or portions to convey various types of information to a user and/or allow the user to manipulate the user interface 5000 such as first and second display regions 5002, 5004.

The first display region 5002 may include any appropriate number of columns, each column including one or more cells for receiving data related to one or more components or end items. While only some columns of the first display region will be described below, it will be appreciated that numerous other columns or sub-regions can be incorporated with the first display region 5002 to increase the functionality of the user interface 5000 and/or provide additional benefits to operators and other users. A scroll bar 5003 may be included to provide access to additional columns. A first columnar region 5006 may include one or more columns related to identificatory information of one or more components. For instance, one column may be entitled "Part Number" and another column may be entitled "Description". Each of such columns may include a number of cells operable to accept part number (e.g., CB768A #81H) and description information (e.g., KWAN) for one or more components.

A second columnar region 5008 may include first and second columns allowing an operator to adjust one or more statistical ranges of one of the graphical representations of the user interface 5000. In one embodiment, the statistical range may be a time range or range of user-defined dates of portions of the second display region 5004. As an example, the second columnar region 5008 may include a first column entitled "Adjust Start" which allows an operator to enter a desired start date of information presented in a graphical representation in the second display region 5004 for a particular component and a second column entitled "Current" which allows an operator to enter a desired end date of information presented in a graphical representation in the second display region 5004 for the particular component. As will be described in more detail below, in one arrangement, the user may modify the cells of such columns by appropriately manipulating one of such cells (e.g., single clicking, double clicking, touching) to bring up a pop-up window, the pop-up window allowing the operator to manipulate such start and end dates. In other arrangements, each cell may include an icon (e.g., drop down arrow) which may open up a calendar (e.g., similar to those on a travel web site) allowing the user to click or otherwise select a desired date. In even further arrangements, a user may be able to manually enter a desired date into such cells.

A third columnar region 5010 may include a number of columns, each column being devoted to one of the target inventory level techniques disclosed herein. For instance, the third columnar region 5010 may include, a first column indicating a historical reorder point (ROP), a second column indicating a slope adjusted historical ROP, a third column indicating a slope projected historical ROP, a fourth column indicating a forecast ROP, and a fifth column indicating a slope adjusted forecast ROP. Other target inventory level techniques may be included in the third columnar region 5010. Each column may be associated with a color different from that of the other columns and may be appropriately numbered (e.g., 1, 2, 3, 4, 5).

With continued reference to FIG. 15, the second display region 5004 may include one or more graphical representations therein. The graphical representations in the second display region 5004 may correspond to a selected component from the first display region 5002. In one embodiment, a user may appropriately manipulate with one or more user interface devices (e.g., mouse, eye gaze) one or more portions (e.g., any portion) of a cell in any of the columns of the first display region 5002 corresponding to a component that the user desires to analyze. For instance, a user may selectively position and/or align a user controllable device such as a pointer or cursor using the user interface device over a portion of a cell and then perform a single click of the mouse or single touch of the finger. As illustrated in FIG. 15, the component corresponding to part number "CB768A #81H" has been selected, and the background of each cell corresponding to such component has been changed to a color different from other cells to indicate that such component has been selected. Additionally or alternatively, other manners of indicating the selected component can be implemented (e.g., the arrow to the left of the first columnar region 5006). After a component has been selected, at least one graphical representation corresponding to the selected component may be displayed in the second display region 5004. A computer readable medium (e.g., storage device 10) and processor (e.g., CPU 6) of the computing device 4 may be operable to cause the display of the graphical representation on the display module (e.g., GUI 16) in the manner discussed above in relation to FIG. 14.

For instance, a first graphical representation 5012 may correspond to a graph or chart illustrating historical usage (e.g., daily) of the selected component and may incorporate the previously discussed historical usage data for the component. A second graphical representation 5014 may correspond to a graph or chart illustrating the previously described lead-time bucket data in addition to one or more of the target inventory levels from the third columnar region 5010. A third graphical representation 5016 may correspond to a graph or chart illustrating forecast data points for the selected component. Other graphical representations may be included in the second display region 5004. In some embodiments, the user may be able to "click and drag" the graphical representations to other locations.

Figure 16A:
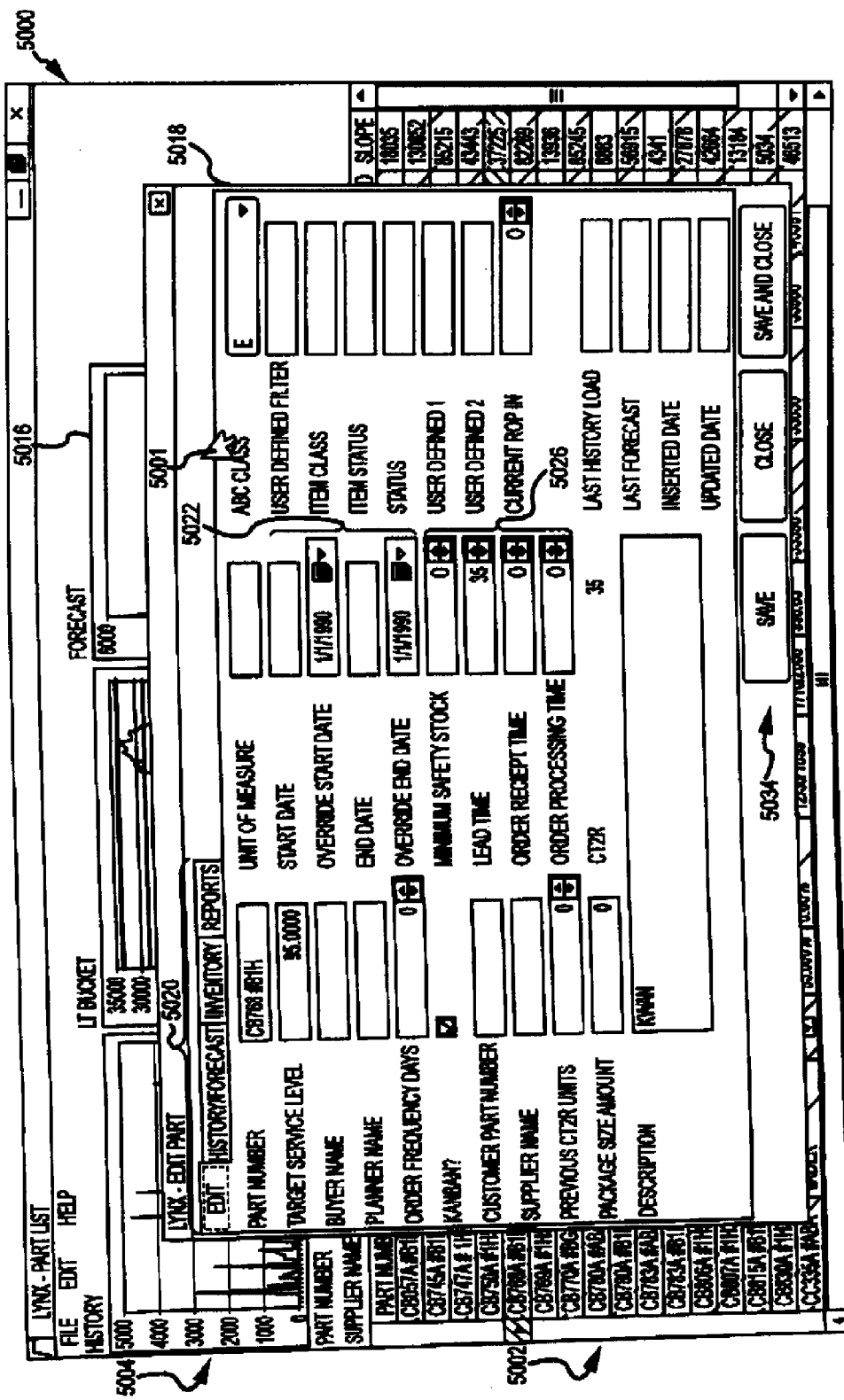
FIG. 16a is the user interface according to the embodiment of FIG. 15 and illustrating a pop-up window usable with the embodiment in a first orientation.

FIG. 16*a* illustrates a pop-up window 5018 that may be associated with the user interface 5000. The pop-up window 5018 may be operable to provide additional access to inventory information related to the components in addition to increasing the manipulability of the user interface 5000. The pop-up window 5018 may be displayed in numerous manners. In one embodiment, a user may appropriately manipulate any portion of the first display region 5002 with a user interface device (e.g., by double clicking or double touching) to bring up or display the pop-up window 5018. In other embodiments additionally or alternatively, a user may appropriate manipulate a portion of one of the graphical representations of the second display region 5004 such as a portion of a line or data point of one of the graphical representations. For instance, the user may selectively position and/or align any user controllable feature (e.g., cursor 5001) over the line or data point (e.g., see FIG. 15) and then manipulate a mouse or other device to bring up or otherwise display the pop-up window 5018.

In any case, once the pop-up window 5018 has been displayed, a user may navigate through various portions of the pop-up window 5018 via selectively positioning a user controllable device within the pop-up window 5018 to appropriately manipulate navigation tabs 5020. The "Edit" navigation tab has been selected in FIG. 16*a*. While each of the portions of the pop-up window 5018 includes various cells, arrows and other functionality, only some portions thereof will be described for clarity.

As seen in FIG. 16*a*, the Edit portion of the pop-up window 5018 may include a number of cells 5022, the manipulation of which may be operable to edit or modify various parameters of the target inventory level analyses. For instance, a first group of cells 5022 may be operable to allow an operator to adjust or modify at least one statistical range of data in the graphical representations of the second display region 5004. In one arrangement, the statistical range may be a date range (that may be user-defined). Some cells in the first group of cells 5022 (e.g., those labeled "Start Date" and "End Date") may be default settings and cannot be changed and hence may be appropriately indicated as such (e.g., by being grayed out). Other cells in the first group of cells 5022 may allow an operator to manually override the start and end dates (e.g., those labeled "Override Start Date" and "Override End Date"). Such cells may be manipulated in any appropriate manner including but not limited to manual keyboard entry, use of a drop down menu that briefly displays a calendar, etc. After such override dates have been entered and a "Save" button 5034 has been manipulated (e.g., depressed), the graphical representations of the second display region 5004 will automatically update with the new time frame (e.g., the x-axis of each of the graphical representations will reflect the new time frame). A second group of cells 5026 may be operable to allow an operator to manually adjust a number of parameters by way of depressing or otherwise manipulating "up" and "down" arrows. For instance, a "Lead Time" cell in the second group of cells 5026 may be operable to adjust the supplier lead time value used to calculate the lead-time buckets. Other cells such as "Minimum Safety Stock," "Order Receipt Time" and "Order Processing Time" may also be included in the pop-up window 5018.

Figure 16B:
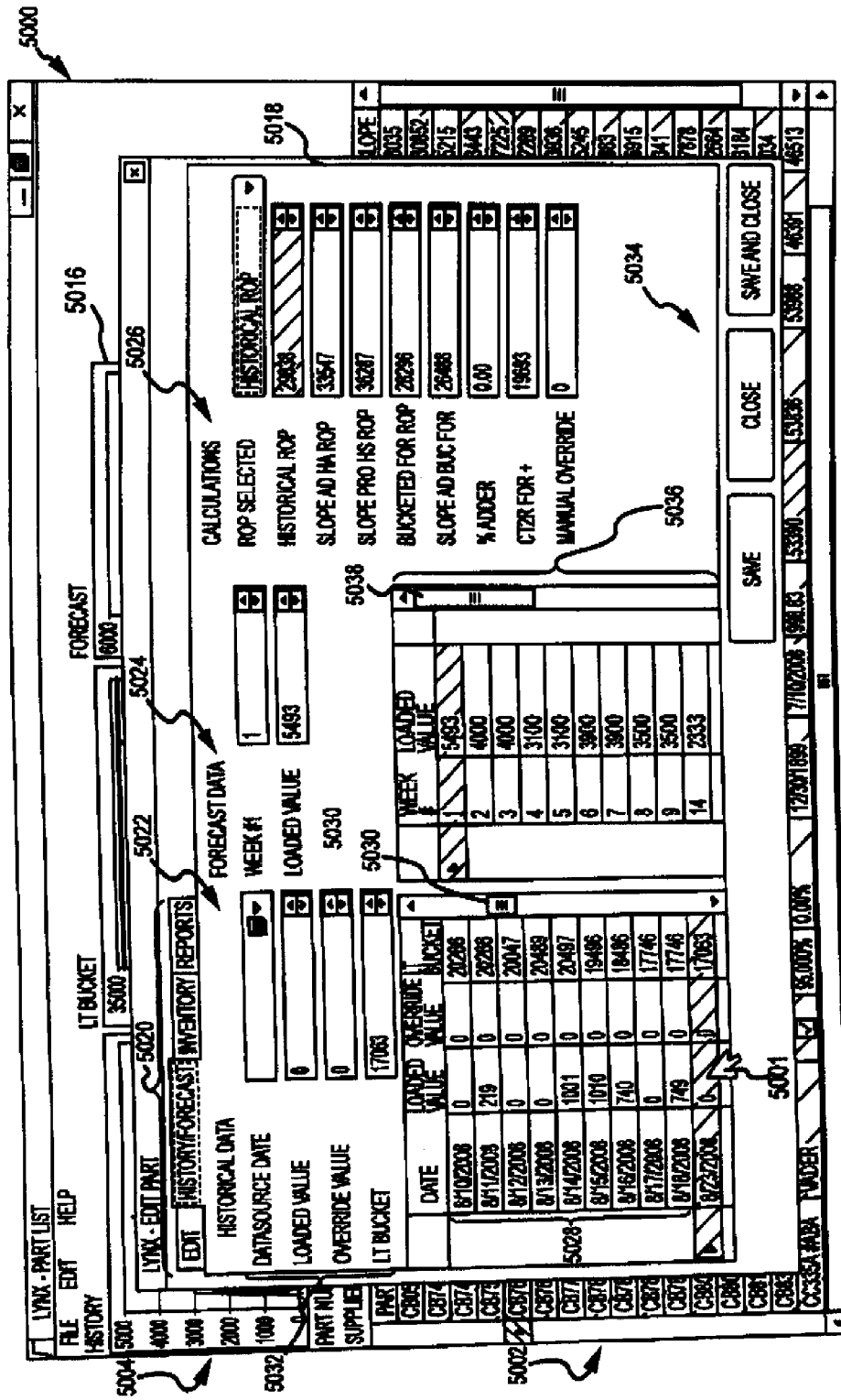
FIG. 16b is the user interface according to the embodiment of FIG. 15 and illustrating a pop-up window usable with the embodiment in a second orientation.

With reference to FIG. 16*b*, the History/Forecast portion of the pop-up window 5018 is illustrated. Again, this portion may include any number of cells, columns, and the like that may allow an operator to modify or adjust various parameters related to historical and forecast data, among other parameters. For instance, this portion may include a "Historical Data" section 5022, a "Forecast Data" section 5024, and a "Calculations" section 5026. The Historical Data section 5022 may include any number of sub-regions, such as a first sub-region 5028 and a second sub-region 5032. The first sub-region 5028 may be in the form of any appropriate grid or spreadsheet type arrangement. As illustrated, the first sub-region 5028 includes a number of columns labeled "Date," "Loaded Value," "Override Value," and "LT Bucket", each of the columns including one or more cells. The Loaded Value column may include historical usage data points (e.g., daily usage), the Override Value column may include a historical usage data points that supersede the usage data points, and the LT Bucket column may provide the lead-time bucket value for each respective date. When an operator appropriately manipulates (e.g., clicking, touching) a desired row of the first sub-region 5028 (e.g., Aug. 23, 2008) such as with cursor 5001, each cell of the row will be displayed in the second sub-region 5032 as will be described below. The selected row may be appropriately modified (e.g., coloring, arrows) to indicate that it has been selected.

The second sub-region 5032 may include a number of cells, at least some of the cells corresponding to columns of the first sub-region 5028. Specifically, upon a user manipulating or selecting a desired row of the first sub-region 5028 (hereinafter referred to as the "selected row"), the date, loaded value (e.g., historical usage data), override value and LT Bucket value will be respectively displayed in corresponding "DataSourceDate," "Loaded Value," "Override Value," and "LT Bucket" cells in the second sub-region 5032. Thereafter, the operator may be able to appropriately manipulate at least some of the cells in the second sub-region 5032 by way of using the "up" and "down" arrows, manual entry, and the like, which, after pressing a save button 5034, correspondingly changes the values in the selected row in addition to updating other values throughout the user interface 5000 (e.g., graphical representations in the second display region 5004, values in the first display region 5002, values in the Calculations section 5026).

Among other advantages, the Historical Data section 5022 may be useful in removing spiked or extraneous component usage data from the target inventory level analysis (or otherwise reducing its magnitude) which may otherwise serve to skew the analysis. For instance, after viewing a spiked data point in the second display region 5004, an operator may display the pop-up window 5018 using previously described methods, locate the spiked data point, and then appropriately override the spike data point (e.g., setting the override value to 0 or at least a lower value than the "spike") to effectively remove the spiked data from the analysis.

With continued reference to FIG. 16b, the Forecast Data section 5024 also may include first and second sub-regions 5036, 5040. The first sub-region 5036 may also be in grid or spreadsheet form with a first column representing weeks and a second column representing a loaded forecast usage value for each respective week. A scroll bar 5038 may be included to view additional weeks and loaded values. Similar to the Historical Data section 5020, a user may appropriately manipulate or select a desired row of the first sub-region 5036 of the Forecast Data section 5024 and then modify one or more of the values in the selected row by modifying the respective vale in the second sub-region 5040. The Calculations section 5026 may include a number of cells, some of which give in an indication of each of the target inventory level techniques. Advantageously, as an operator modifies the various loaded values in the pop-up window 5018 and manipulates the save button 5034, one or more of the target inventory level cells may be correspondingly modified.

Figure 16C:
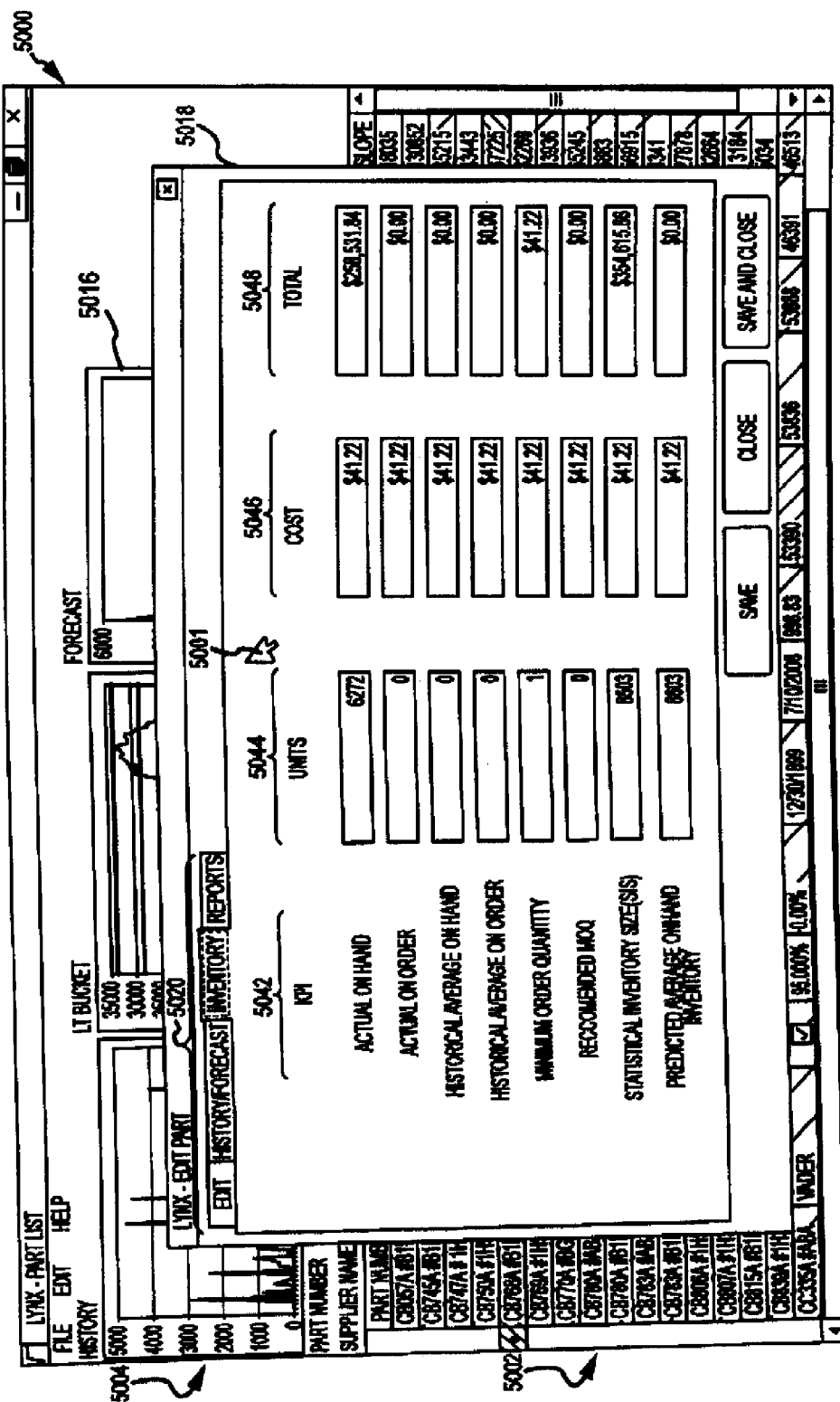
FIG. 16c is the user interface according to the embodiment of FIG. 15 and illustrating a pop-up window usable with the embodiment in a third orientation.

Now referring to FIG. 16c, the Inventory portion of the pop-up window 5018 is illustrated, and may generally include a number of cells and/or columns and/or rows related to component availability and costs. For instance, a first column 5042 may indicate a type of inventory (e.g., Actual On Hand, Historical Average On Order), second and third columns may indicate a number of units and a cost per unit for the type of inventory, and a fourth column may indicate a total cost for type of inventory (e.g., units times cost per unit). A user may efficiently appropriately manipulate the cells to obtain total cost information for various types of inventory.

Figure 16D:
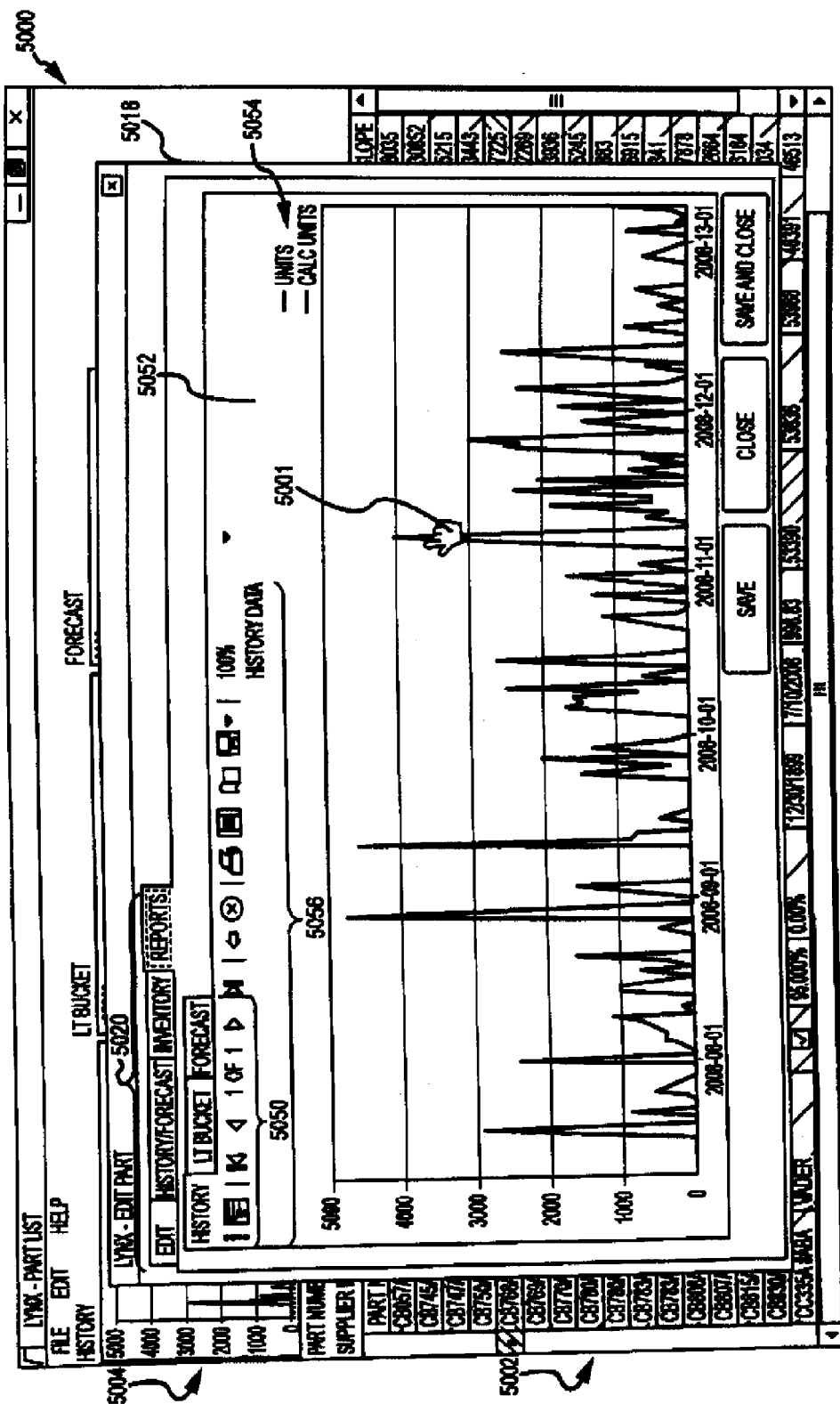
FIG. 16d is the user interface according to the embodiment of FIG. 15 and illustrating a pop-up window usable with the embodiment in a fourth orientation.

The Reports portion of the pop-up window 5018 is illustrated in FIG. 16d and may generally provide a more detailed view of the graphical representations from the second display region 5004. The Reports portion may include a plurality of navigation buttons 5050 that may allow an operator to toggle between the various graphical representations. For instance, upon appropriate manipulation of one of the navigation buttons 5050, (e.g., the "History" button that has been depressed in FIG. 16d), the Historical usage graphical representation from the second display section 5004 is displayed in a display region 5052 of the Reports section. The graphical representation may be of a different size (e.g., larger, smaller) to facilitate operator viewing and usage and may include a legend 5054 to assist in interpreting the graphical representation. In some embodiments, an operator may align a user controllable feature (e.g., cursor 5001) over a portion of the graphic presentation (e.g. data point) and manipulate a user controlling device (e.g. clicking a mouse) to be linked to the corresponding data point in the "EDIT" portion. Action tabs 5056 may be included allowing a user to perform other functions related to the display section 5052 such as printing, saving, changing a zoom level, etc.

It will be appreciated that any appropriate logic, code or the like can be utilized in combination with the various components of the system 2 (e.g., processor 6, memory 8, storage 10, GUI 16, speakers 18, mouse 20, keyboard 22) to cause the operation and display of the various user interfaces disclosed herein. Furthermore, any of the various features of the various embodiments and arrangements (or even additional features) can be utilized with other embodiments and arrangements. For instance, drop-down menus and arrows may be replaced by manual entry cells, or the color-coding may be replaced by patterns, graphics (e.g., icons) and the like. As another example, the customer satisfaction level portion of the first embodiment of the user interface 4000 may be utilized with the second embodiment of the user interface 5000. Other arrangements are contemplated.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the embodiments. The embodiments described hereinabove are further intended to explain the best modes known of practicing the invention and to enable others skilled in the art to utilize the invention in such, or other embodiments and with various modifications required by the particular application(s). It is intended that the appended claims be construed to include alternative embodiments to the extent permitted by the prior art.

What is claimed is:

1. An inventory control system for determining a target inventory level of at least one component of a product, comprising:
   a computer readable medium, comprising:
      component usage data indicative of a magnitude of at least one of historical consumption of the at least one component during a time period and forecasted consumption of the at least one component during a time period; and
      a target inventory module that is employable to determine a plurality of target inventory levels for the at least one component at least in part by analyzing the component usage data, the target inventory module including computer readable instructions that are operable to:
         sum a portion of the component usage data for a plurality of at least partially non-overlapping time periods that are each equal in duration to a supplier lead-time period for the at least one component to create lead-time usage data, wherein each one of said plurality of at least partially non-overlapping time periods corresponds with a time period that is at least partially different from time periods corresponding with each of the other ones of said plurality of at least partially non-overlapping time periods, and wherein for each one of said plurality of at least partially non overlapping time periods, the lead-time usage data comprises one of a plurality of lead-time usage data points that corresponds with a total summed amount of said portion of the component usage data for the time period to provide a corresponding lead-time bucket; and
         determine the plurality of target inventory levels from the lead-time usage data, wherein each of the target inventory levels indicates an inventory level of the at least one component for use in generating additional orders of the at least one component;
a processor that is operable to employ the computer readable instructions to determine the plurality of target inventory levels; and
a display module that is operable to provide at least one graphical representation indicative of at least one of the plurality of target inventory levels, component usage data corresponding with the at least one component, and lead-time usage data, as a function of time.

2. The system of claim 1, wherein the computer readable instructions of the target inventory module are operable to statistically determine a variance amount of each of the plurality of target inventory levels of the at least one component, wherein the variance amount is operable to be added to a base inventory amount to create one of the plurality of target inventory levels.

3. The system of claim 2, wherein the computer readable instructions are operable to statistically determine the variance amount by carrying out the steps of:
calculating a standard deviation of the lead-time usage data;
identifying a number of standard deviations that includes a predetermined percentage of the lead-time data; and
multiplying the standard deviation by the number of standard deviations to generate the variance amount.

4. The system of claim 2, wherein each of the plurality of target inventory levels is determinable by the processor utilizing a selected one of a plurality of different computer readable instruction sets.

5. The system of claim 4, wherein a first of the plurality of different computer readable instruction sets is operable to carry out the steps of:
determining an average of the lead-time usage data to create the base inventory amount; and
summing the base inventory amount and the variance amount.

6. The system of claim 4, wherein a second of the plurality of different computer readable instruction sets is operable to carry out the steps of:
creating adjusted lead-time usage data;
determining an average of the adjusted lead-time usage data to create the base inventory amount; and
summing the base inventory amount and the variance amount.

7. The system of claim 6, wherein the creating step comprises:
fitting a line to the lead-time usage data; and
using the line to calculate the adjusted lead-time usage data.

8. The system of claim 7, wherein the using step comprises identifying a slope of the line.

9. The system of claim 4, wherein a third of the plurality of different computer readable instruction sets is operable to carry out the steps of:
creating a projected growth level of the at least one component;
determining an average of the lead-time usage data to create the base inventory amount; and
summing the base inventory amount, the variance amount and the projected growth level.

10. The system of claim 9, wherein the lead-time usage data comprises adjusted lead-time usage data.

11. The system of claim 4, wherein a fourth of the plurality of different computer readable instruction sets is operable to carry out the steps of:
analyzing component usage data indicative of forecasted consumption of the at least one component during a time period to create the base inventory amount; and
summing the base inventory amount and the variance amount.

12. The system of claim 11, wherein the analyzing step comprises:
determining dimensions of the supplier lead-time period;
obtaining an average of the component usage data indicative of forecasted consumption in the dimensions of the supplier lead-time period; and
multiplying the supplier lead-time period by the average of the component usage data indicative of forecasted consumption to create the base inventory amount.

13. The system of claim 4, wherein a fifth of the plurality of different computer readable instruction sets is operable to carry out the steps of:
analyzing component usage data indicative of forecasted consumption of the at least one component during a time period to create the base inventory amount; and
summing the base inventory amount and the statistical inventory level, wherein the variance amount is determined utilizing adjusted lead-time usage data.

14. The system of claim 4, further comprising:
at least one user interface device for operatively interfacing with the display module, wherein the at least one user interface device is operable to select a first portion of the display module corresponding with the at least one component to display at least one graphical representation indicative of at least one of the plurality of target inventory levels for the at least one component on a second portion of the display module according to at least one of the plurality of different computer readable instruction sets.

15. The system of claim 14, wherein the at least one user interface device is selected from the group consisting of a hand manipulable point and click device, a touch screen device, a keyboard, a retinal detection device, and a voice recognition device.

16. The system of claim 14, wherein the display module comprises a plurality of display regions, wherein the first portion of the display module comprises a first of the plurality of display regions, wherein the first of the plurality of display regions includes a plurality of cells, wherein each of the cells corresponds with at least one component, and wherein the user interface device is operable to select one of the plurality of cells to display the at least one graphical representation indicative of the at least one of the plurality of target inventory levels for the at least one component on the second portion of the display module.

17. The system of claim 16, wherein the second portion of the display module comprises a second of the plurality of display regions.

18. The system of claim 1, further comprising:
at least one user interface device to operatively interface with the display module, and
at least one user controllable device that is operable to be controlled by the least one user interface device to select any of a plurality of display regions of the display module for operative interface, wherein a first of the plurality of display regions includes the at least one graphical representation, wherein a second of the plurality of display regions includes a plurality of cells, wherein each of the cells corresponds with at least one component, and wherein the at least one user interface device and the at least one user controllable device are operable to provide a plurality of user manipulable features for modifying the at least one graphical representation.

19. The system of claim 18, wherein a first user manipulable feature of the plurality of user manipulable features is employable to set at least one statistical range of the at least one graphical representation.

20. The system of claim 19, wherein the at least one user interface device and the at least one user controllable device are operable to provide the first user manipulable feature for inputting at least one statistical range into one or more cells of the second display region.

21. The system of claim 19, wherein the statistical range comprises a range of user-defined dates.

22. The system of claim 18, wherein a second user manipulable feature of the plurality of user manipulable features is employable to display at least one pop-up window on the display module.

23. The system of claim 22, wherein the at least one user interface device and the at least one user controllable device are operable to provide the second user manipulable feature for selecting of a portion of the at least one graphical representation to display the at least one pop-up window on the display module.

24. The system of claim 23, wherein the portion of the at least one graphical representation comprises at least one data point of the at least one graphical representation.

25. The system of claim 22, wherein the at least one user controllable device is selectively positionable within the pop-up window to modify the component usage data.

26. The system of claim 25, wherein the at least one user controllable device is selectively positionable within the pop-up window to modify a statistical range of the at least one graphical representation.

27. The system of claim 1, wherein the computer readable medium further comprises computer readable instructions that are employable by the processor to:
   determine an actual inventory level for said at least one component;
   compare said actual inventory level to at least one of said target inventory levels; and
   generate an order for an additional quantity of said at least one component when the actual inventory level is substantially equal to or less than said at least one of said target inventory levels.

28. The system of claim 27, wherein the actual inventory level comprises on-hand inventory and on-order inventory for the at least one component.

\* \* \* \* \*